(12) United States Patent
Arab et al.

(10) Patent No.: US 12,172,463 B2
(45) Date of Patent: Dec. 24, 2024

(54) ROBOTIC DEVICE, ASSEMBLY, AND METHOD FOR MOVING THE SAME

(71) Applicant: SAUDI ARABIAN OIL COMPANY, Dhahran (SA)

(72) Inventors: Abdullah Faisal Arab, Dhahran (SA); Fadl Abdellatif, Thuwal (SA); Aziz U. Rehman, Dhahran (SA); Sultan A. Shaqaq, Al Ahsa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 945 days.

(21) Appl. No.: 17/200,202

(22) Filed: Mar. 12, 2021

(65) Prior Publication Data

US 2022/0291676 A1    Sep. 15, 2022

(51) Int. Cl.
*B60B 19/00* (2006.01)
*B60K 1/04* (2019.01)
*G05D 1/00* (2006.01)

(52) U.S. Cl.
CPC .............. *B60B 19/006* (2013.01); *B60K 1/04* (2013.01); *G05D 1/0278* (2013.01)

(58) Field of Classification Search
CPC ... B60B 19/006; B60B 2900/931; B60K 1/04; G05D 1/0278; B62D 57/024
See application file for complete search history.

(56) References Cited

U.S. PATENT DOCUMENTS

| 804,371 A | 11/1905 | Behan |
| 5,782,177 A | 7/1998 | Rindfleisch |
| 10,343,276 B2 | 7/2019 | Carrasco Zanini et al. |
| 10,830,837 B2 * | 11/2020 | Oetiker ................. B60B 19/006 |
| 2013/0151043 A1 | 6/2013 | Jung |

(Continued)

FOREIGN PATENT DOCUMENTS

| CN | 101386173 A | 3/2009 |
| CN | 106585269 A | 4/2017 |

(Continued)

OTHER PUBLICATIONS

"Electromagnetic Propulsion Bikes"; Dec. 5, 2011; Retrieved from the Internet: URL: https://www.yankodesign.com/2011/12/05/electromagnetic-propulsion-bikes/ (8 pages).

(Continued)

*Primary Examiner* — Richard M Camby
(74) *Attorney, Agent, or Firm* — Osha Bergman Watanabe & Burton LLP

(57) ABSTRACT

A robotic device may include a housing comprising the shape of a wheel, the housing having a magnetically conductive outer surface and an inner chamber. The robotic device may include a plurality of magnetic elements disposed around the inner chamber of the housing, the plurality of magnetic elements being coupled to a first end of a power drive. The robotic device may include a processor disposed in the inner chamber of the housing, the processor being coupled to a second end of a power drive. The processor may use the power drive to instructs at least one magnetic element out of the plurality of magnetic elements to magnetize. The at least one magnetic element may be magnetized without magnetizing any other magnetic element out of the plurality of magnetic elements.

20 Claims, 24 Drawing Sheets

(56) References Cited

U.S. PATENT DOCUMENTS

| | | | | |
|---|---|---|---|---|
| 2014/0230711 | A1* | 8/2014 | Lovelace | B63B 59/08 |
| | | | | 180/9.1 |
| 2015/0153312 | A1* | 6/2015 | Gonzalez | G01N 29/048 |
| | | | | 901/44 |
| 2017/0036349 | A1* | 2/2017 | Dubrovsky | G05D 1/027 |
| 2018/0202085 | A1 | 7/2018 | Budillon et al. | |
| 2020/0094618 | A1* | 3/2020 | La | B60C 11/14 |

FOREIGN PATENT DOCUMENTS

| | | | |
|---|---|---|---|
| CN | 107487391 | A | 12/2017 |
| DE | 4116068 | A1 | 11/1992 |
| GB | 23491 | A | 9/1903 |
| JP | 2006008275 | A | 1/2006 |
| KR | 19990040118 | U | 11/1999 |
| KR | 101281336 | B1 | 7/2013 |
| KR | 101378931 | B1 | 3/2014 |
| KR | 20150024707 | A | 3/2015 |
| WO | 2012047079 | A1 | 4/2012 |

OTHER PUBLICATIONS

International Search Report and Written Opinion issued in corresponding International Patent Application No. PCT/US2022/020029, mailed on Aug. 8, 2022 (15 pages).

\* cited by examiner

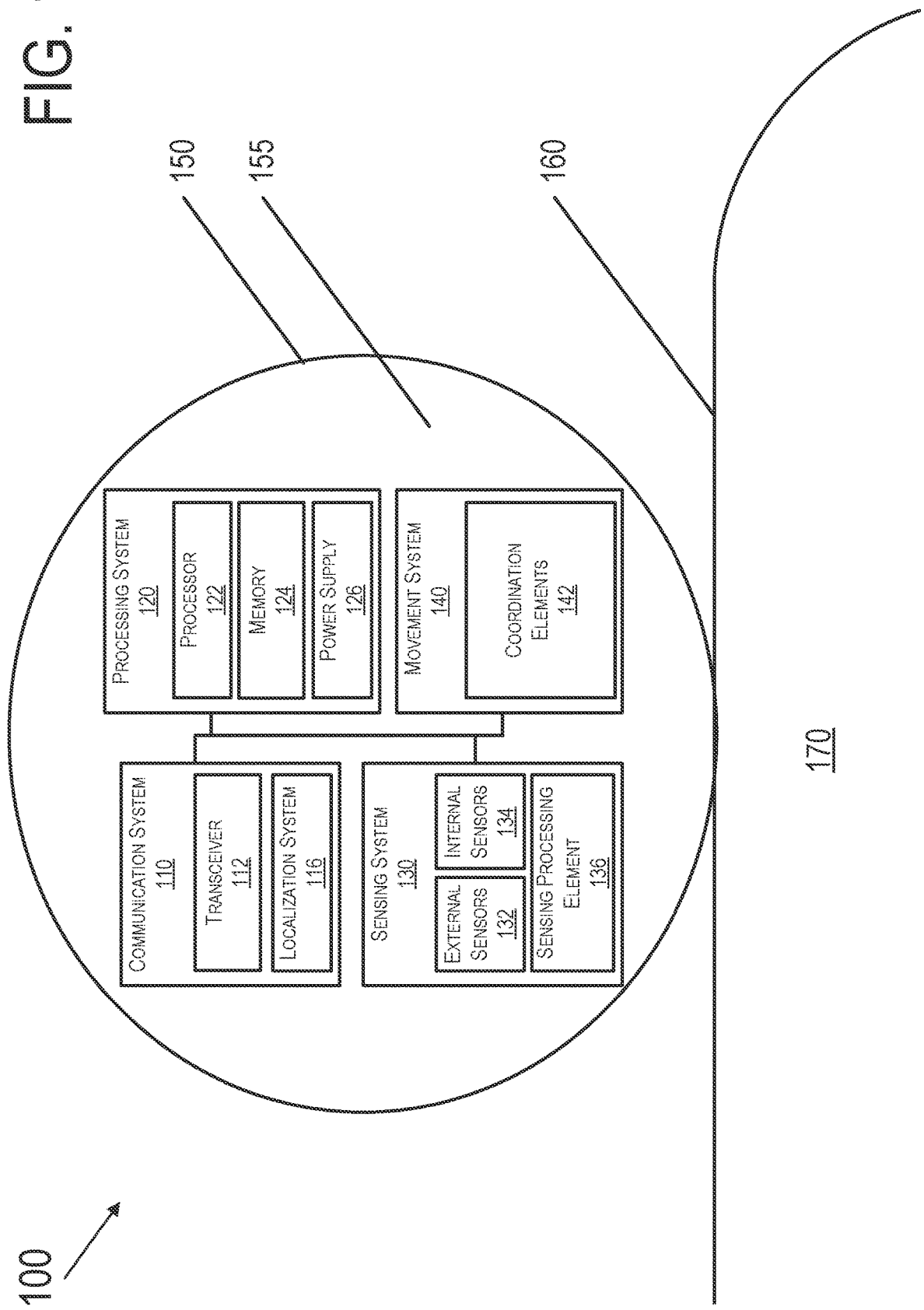

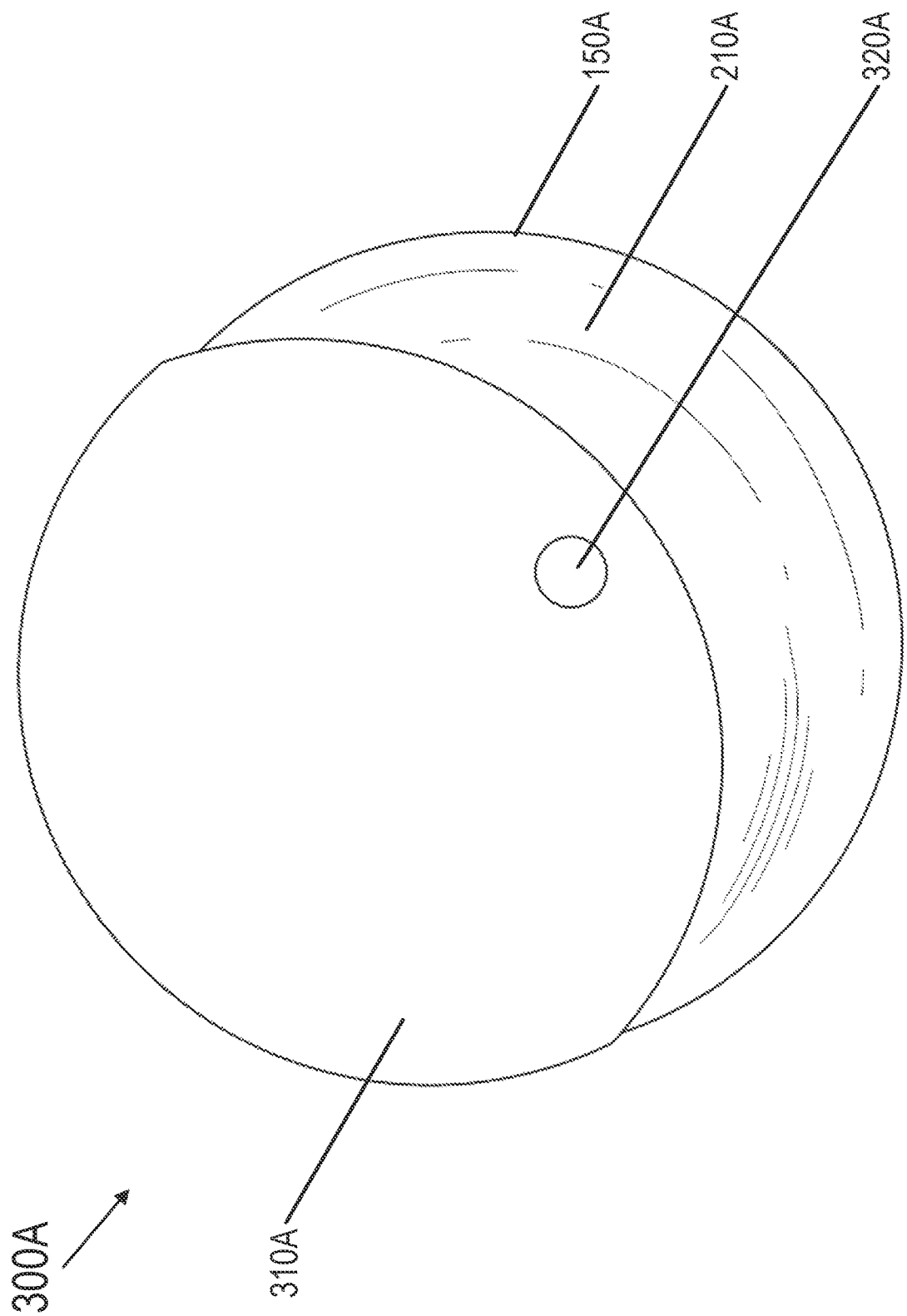

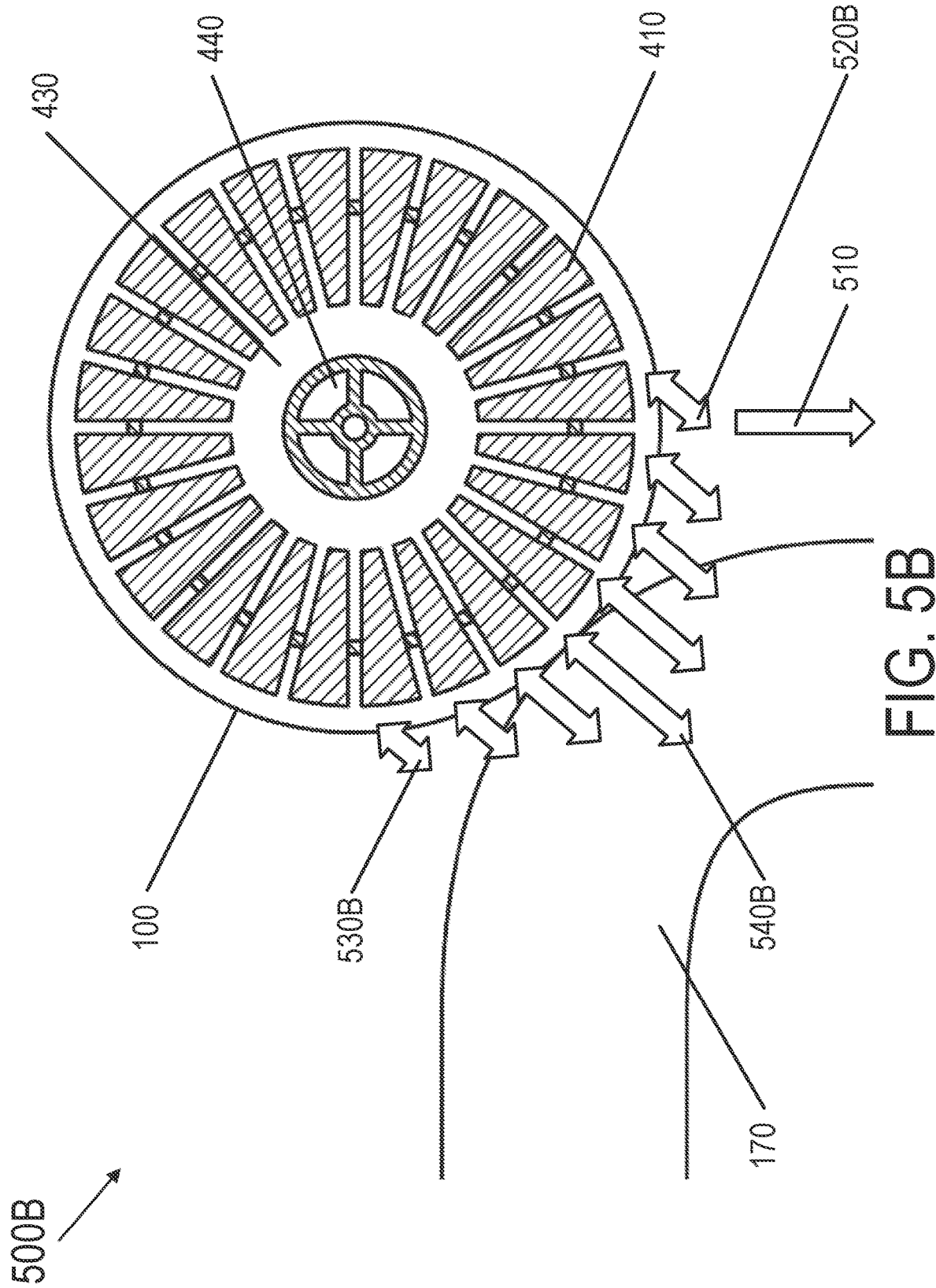

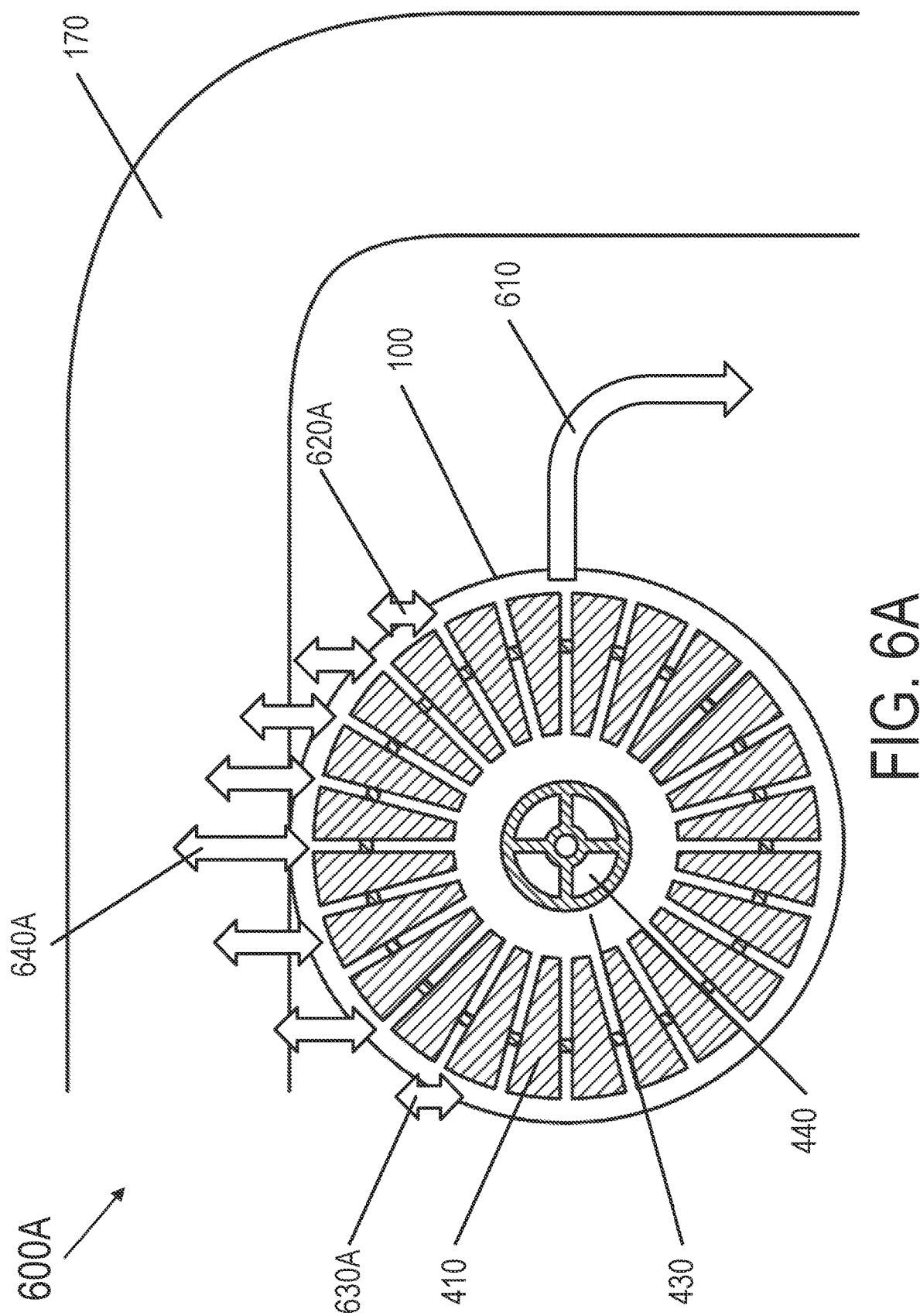

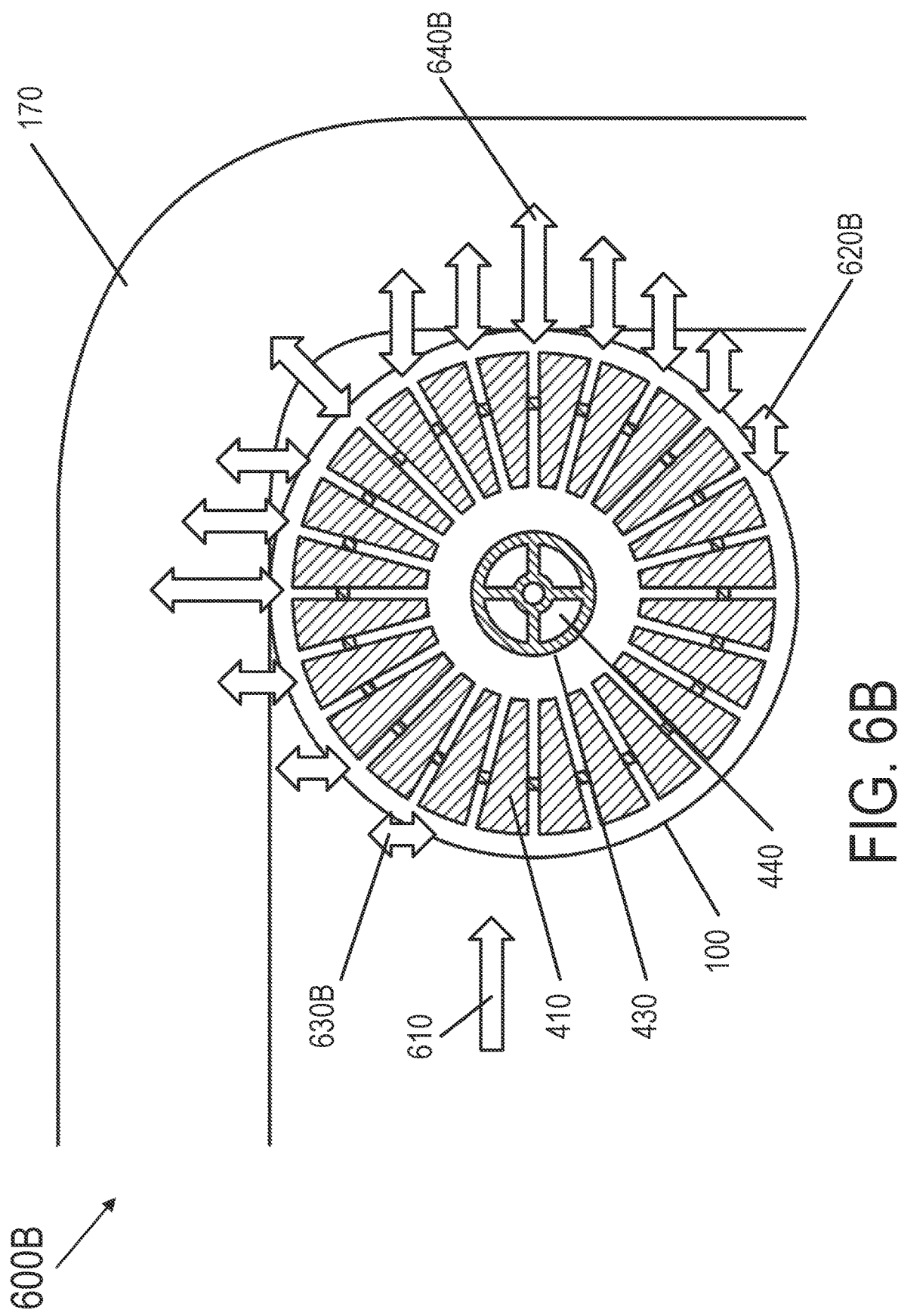

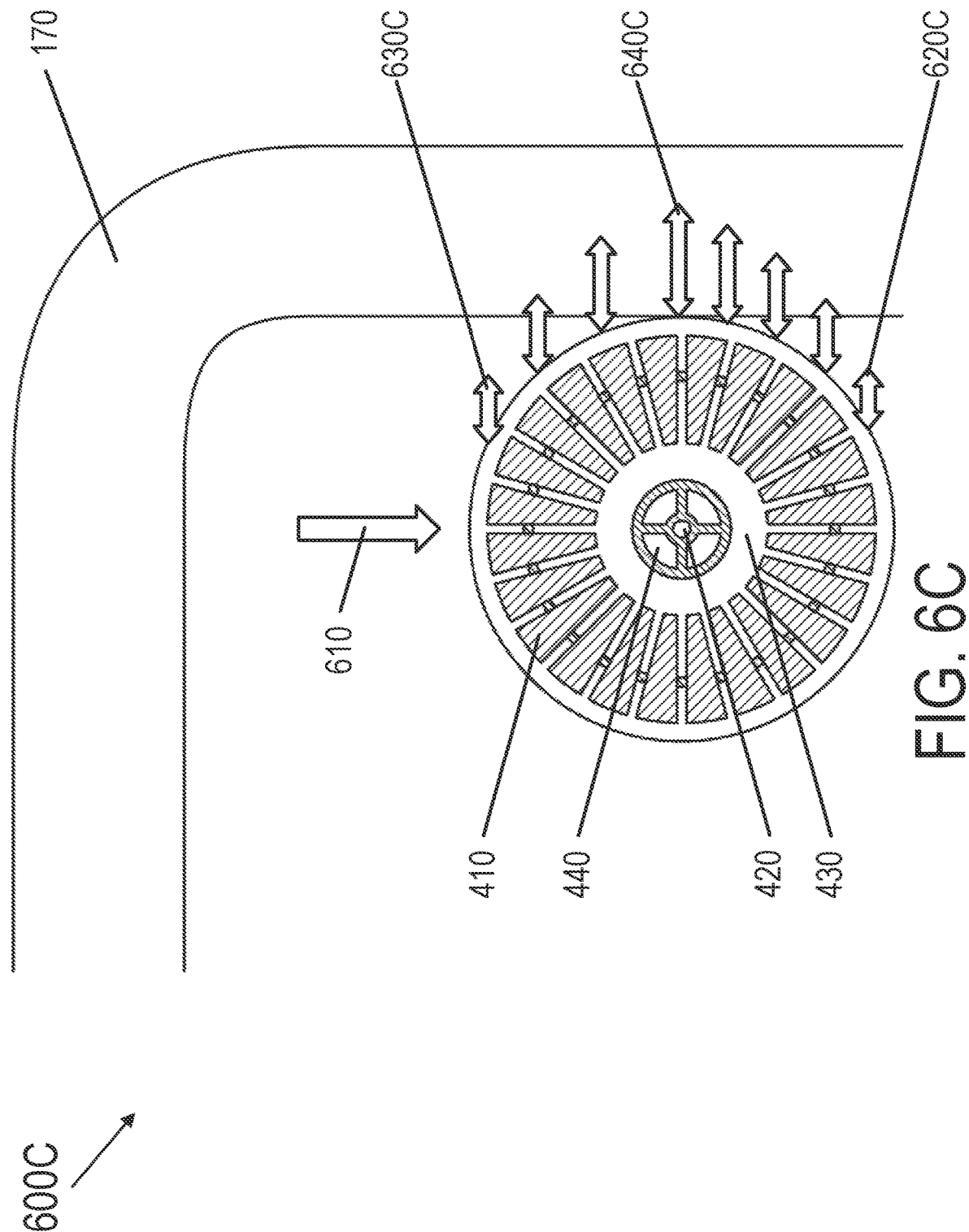

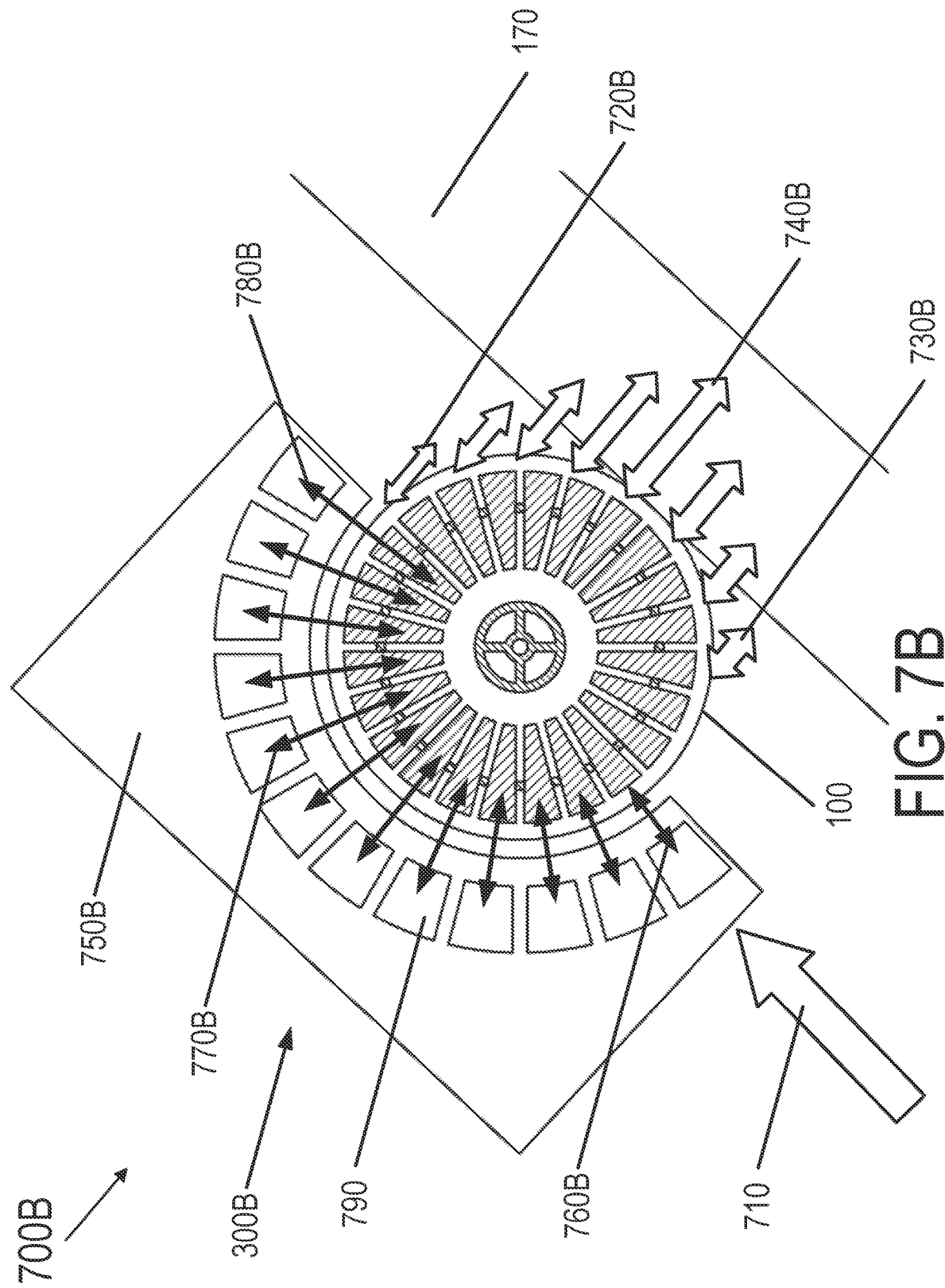

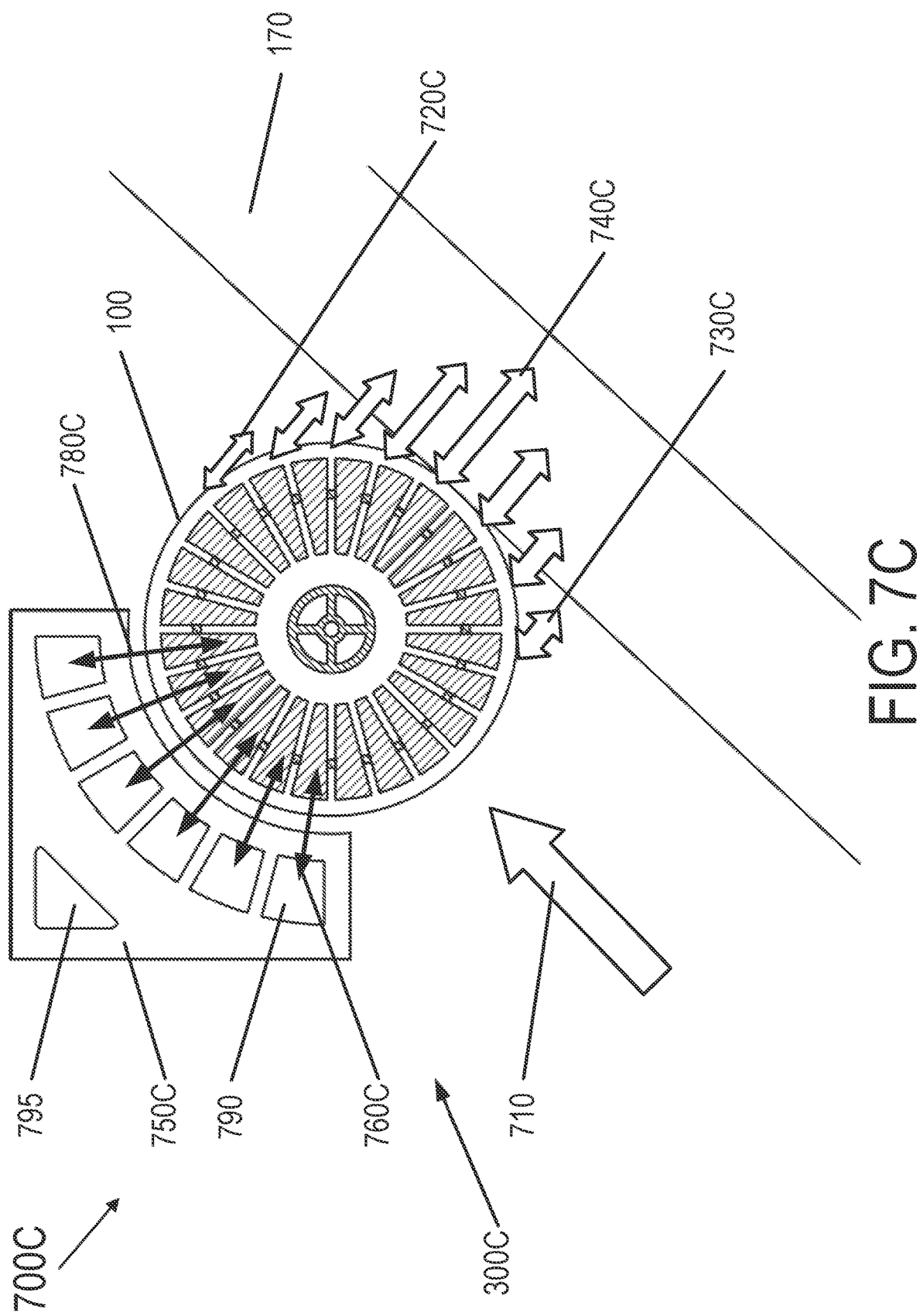

ROBOTIC DEVICE, ASSEMBLY, AND METHOD FOR MOVING THE SAME

BACKGROUND

Inspection applications use wheels to move along ferrous assets and the usual procedure requires scaffolding and man lifts for operating these inspection devices in elevated areas, which is costly and time consuming. Conventional inspection devices use fixed wheels which allows for climbing and navigation. These wheels are limited in that they cannot traverse sharp 90-degree bends or cross flanges. When trying to traverse a 90-degree bend, these wheels get stuck in the corner since going to either direction (forward or backward from the bend) requires overcoming a large resistive friction/pull force in the opposite direction and forcing the wheel to separate from the unwanted surface which requires a large force or motor torque and wheel traction.

SUMMARY

In general, in one aspect, embodiments disclosed herein relate to a robotic device. The robotic device includes a housing comprising the shape of a wheel, the housing having a magnetically conductive outer surface and an inner chamber. The robotic device includes a plurality of magnetic elements disposed around the inner chamber of the housing, the plurality of magnetic elements being coupled to a first end of a power drive. The robotic device includes a processor disposed in the inner chamber of the housing, the processor being coupled to a second end of a power drive. The processor uses the power drive to instructs at least one magnetic element out of the plurality of magnetic elements to magnetize. The at least one magnetic element is magnetized without magnetizing any other magnetic element out of the plurality of magnetic elements.

In general, in one aspect, embodiments disclosed herein relate to a robotic assembly. The robotic assembly includes a robotic device. The robotic device includes a housing comprising the shape of a wheel, the housing having a magnetically conductive outer surface and an inner chamber. The robotic device includes a plurality of magnetic elements disposed around the inner chamber of the housing, the plurality of magnetic elements being coupled to a first end of a power drive. The robotic device includes a processor disposed in the inner chamber of the housing, the processor being coupled to a second end of a power drive. The processor uses the power drive to instructs at least one magnetic element out of the plurality of magnetic elements to magnetize. The at least one magnetic element is magnetized without magnetizing any other magnetic element out of the plurality of magnetic elements. The robotic assembly includes a chassis coupled to the robotic device, the chassis comprising additional magnetic elements disposed to match a portion of the plurality of magnetic elements around the inner chamber. The robotic assembly includes a clamping element that connects the chassis to the robotic device.

In general, in one aspect, embodiments disclosed herein relate to a method for moving a robotic device. The method includes obtaining information relating to a direction of movement for the robotic device. The method includes evaluating magnetization information corresponding to a plurality of magnetic elements located in the robotic device. The method includes generating a magnetization protocol to move the robotic device in the direction of movement, the magnetization protocol comprising instructions to magnetize a sequence of magnetic elements out of the plurality of magnetic elements over a period of time. The method includes implementing the magnetization protocol by instructing at least one magnetic element out of the plurality of magnetic elements to magnetize, the at least one magnetic element being magnetized without magnetizing any other magnetic element out of the plurality of magnetic elements. The method includes moving the robotic device in the direction of movement at a speed determined based on the magnetization protocol.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 1 shows a schematic diagram showing a robotic device in accordance with one or more embodiments.

FIG. 3A shows a perspective of a robotic assembly in accordance with one or more embodiments.

FIGS. 5A-5C show a cross-section view of a robotic device moving in accordance with one or more embodiments.

FIGS. 6A-6C show a cross-section view of a robotic device moving in accordance with one or more embodiments.

FIGS. 7A-7C show cross-section views of a robotic device moving in accordance with one or more embodiments.

DETAILED DESCRIPTION

Figure 2A:
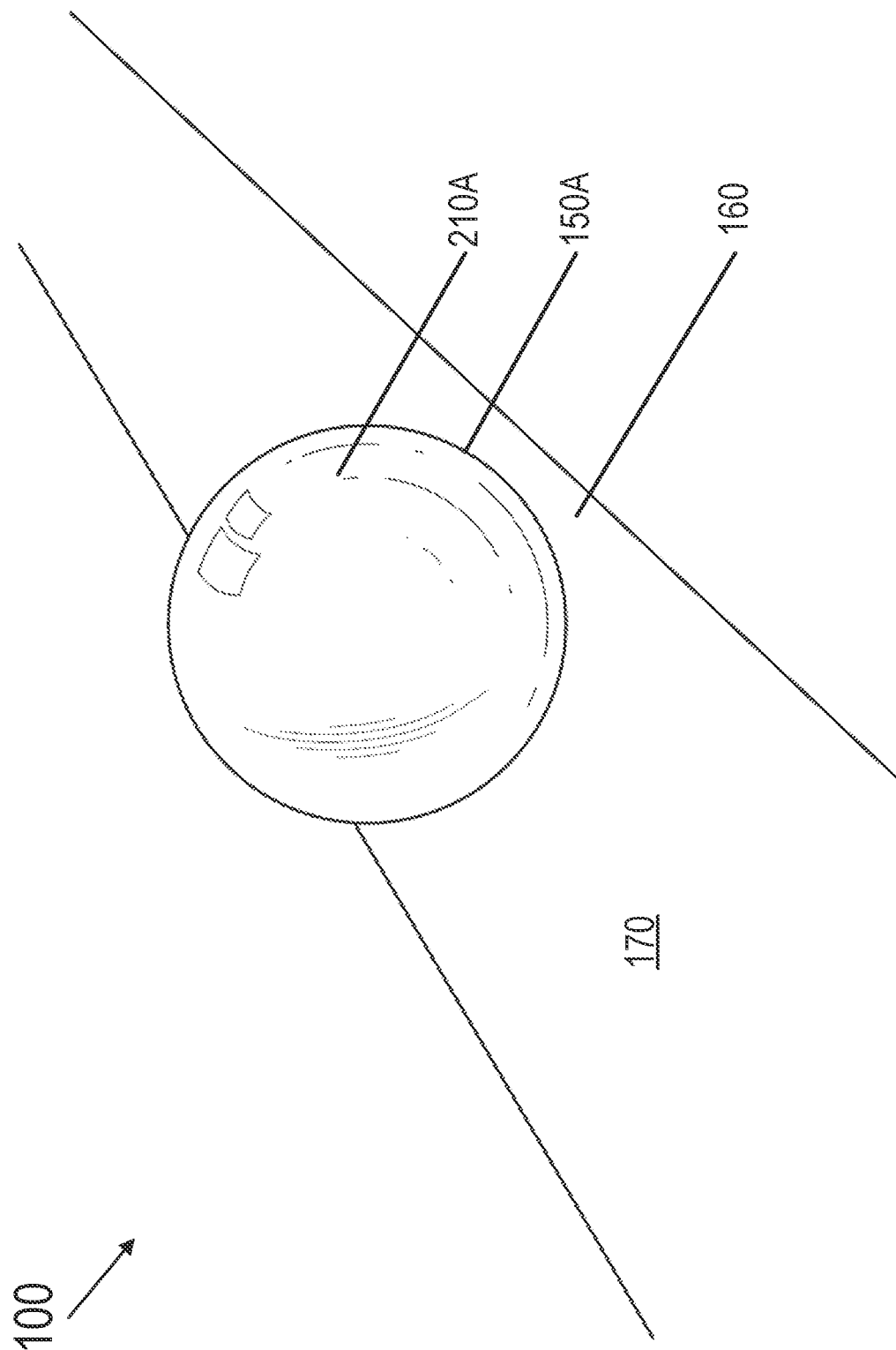
FIG. 2A shows a perspective view of a robotic device in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a robotic device in the shape of a sphere, a wheel, or a rod, that provides the technological solution of avoiding obstacles such as bends and flanges while traversing ferrous assets. Specifically, one or more embodiments include a robotic device that reaches elevated ferromagnetic assets without the use of scaffolding and man lifts. The robotic device may include multiple electromagnetic elements spread around a circumference to enable control of the magnetic force direction and strength. In this regard, the robotic device may climb bends and flanges by controlling the magnetic force direction in specific electromagnetic elements around the circumference. The robotic device may not require a motor to rotate and climb because the robotic wheel moves by attracting the electromagnetic elements and a ferrous surface of the ferrous asset using the magnetic force. To navigate, a specific electromagnetic element may be turned on or its magnetic force may be increased. To rotate the robotic device, a portion of the robotic device (e.g., a selection of a third or a quarter of a total number of electromagnetic elements) may be turned on in a gradual sequence to rotate in a traversal motion.

When overcoming a bend, the electromagnetic elements located at a front of the robotic device may be turned on at different magnetic force strengths. By sequentially increasing the magnetic force toward the ferrous surface, a frontmost electromagnetic element will pull the robotic device towards the ferrous surface while the closest electromagnetic elements to the ferrous surface act as pivot points causing the robotic device as a whole to move forward.

Magnetic force is affected by distance, temperature, and contact area. As such, in some embodiments, having the electromagnetic elements around the circumference decreases a distance between each electromagnetic element and the ferrous surface thus increasing the magnetic force. Further, in some embodiments, a robotic device having a housing shaped as a wide wheel increases a contact area with the ferrous surface resulting in stronger magnetic forces. In addition, in some embodiments, increasing the electromagnetic elements increases the movement precision of the magnetic force. In this regard, more electromagnetic elements increase the density of the magnetic field and increase the magnetic force being applied.

A flexible microcontroller may be used to fit inside the robotic device. In this regard, having the flexible microcontroller reduces the distance between the electromagnetic elements and the flexible microcontroller and reduces wiring and weight. The microcontroller may be used to control the electromagnetic elements inside the robotic device without requiring remote transmissions of commands to the robotic device. Because the magnetic force can be controlled and programmed, the robotic device may adjust the magnetic force to operate in various surface types and temperature conditions. Simultaneously, the electromagnetic elements may be used as a magnetic force sensor to detect magnetic forces on the wheel.

To improve the power consumption and the combined weight of the robotic device, the electromagnetic elements may include switchable holding electromagnets instead of permanent magnets. Switchable holding electromagnets allow for the robotic device to be opened for servicing when one electromagnetic element out of the electromagnetic elements malfunctions.

In one or more embodiments, the robotic device is not made only using ferrous materials. While ferrous materials allow magnetic flux to travel through them, the robotic device may be made of both ferrous and non-ferrous materials, such as titanium, aluminum, plastics, and/or rubber. Advantageously, using non-ferrous materials helps to eliminate coating scratching issues caused by conventional ferrous wheels.

In some embodiments, the robotic device may be adapted for a specific application. Depending on the application the robotic device may be a standalone robot, or it may be used as a wheel for a device. When used as standalone robot, the robotic device may have its own power and control enclosed in a same housing that includes the electromagnetic elements. When used as a wheel for a device, various robotic devices may be attached side by side to increase the magnetic force onto the ferrous surface, if needed. Also, if used as a scanning device, adding various robotic devices to a single assembly may cover more scanning area. Moreover, the housing of the robotic device may be adapted to allow for omni-directional movement. The shapes of the housing may include cylindrical lines forming tracks, cylindrical rolling wheels, spheres/balls, or truncated icosahedrons.

Moreover, if the robotic device is attached to a larger device or assembly, the need for a drive motor may be eliminated by using permanent magnets attached to a chassis in the larger device or assembly over the wheel.

FIG. 1 shows a schematic diagram showing various systems that may be incorporated into a robotic device 100. The robotic device 100 may include a housing 150 having a circular cross-section. The robotic device may be in the shape of a sphere, a wheel, or a rod, that provides the technological solution of avoiding obstacles such as bends and flanges while traversing a ferrous asset 170. The housing 150 is not made only using ferrous materials. While ferrous materials allow magnetic flux to travel through them, the robotic device may have a housing of both ferrous and non-ferrous materials, such as titanium, aluminum, plastics, and/or rubber. Using non-ferrous materials helps to eliminate coating scratching issues caused between the friction of the housing 150 against an outer surface 160 of the ferrous asset 170.

In some embodiments, the housing 150 includes an inner chamber 155 that holds various electromagnetic elements (i.e., magnetic elements) and various systems configured to attach and move the housing 150 along the surface 160. These systems may be electronic components that enable the robotic device 100 to perform communication functions, data collecting functions, and/or processing functions. In some embodiments, the robotic device 100 includes a communication system 110, a processing system 120, a sensing system 130 and a movement system 140 coupled to the inner chamber 155. The communication system 110 may include communication devices such as a transceiver 112 performing the functions of a transmitter and a receiver. The transceiver 112 may transmit and receive communication signals. Specifically, the transceiver 112 may communicate with one or more control systems located at a remote location through a wireless connection. In some embodiments, the communication system 110 may communicate wirelessly with a control system at a base of operations. In some embodiments, the communication system 110 may include a localization system 116 that acts as a relay to transfer information from the robotic device 100 to various control systems located at different locations. The localization system 116 may include a global positioning system (GPS) that tracks the location of the robotic device 100.

The processing system 120 may include a processor 122, a memory 124, and a power supply 126. The processor 122 may perform computational processes simultaneously and/or sequentially. The processor 122 may determine information to be transmitted and processes to be performed using information received or collected. Similarly, the processor 122 may control collection and exchange of geospatial information from the robotic device 100. The power supply 126 provides power to the systems in the inner chamber 155 through wired connections. The power supply 126 may be a battery that is recharged using induction or solar systems.

The sensing system 130 may include external sensors 132, internal sensors 134, and a sensing processing element 136. The external sensors 132 may be sensors that collect physical data from the environment surrounding the robotic device 100. The internal sensors 134 may be sensors that collect physical data from the environment surrounding the inner chamber 155 of the robotic device 100. The external sensors 132 and the internal sensors 134 may be lightweight sensors requiring a small footprint. These sensors may exchange information with each other and supply it to the processor 122 for analysis. The external sensors 132 and the internal sensors 134 may be logging tools of an electrical type, a nuclear type, a sonic type, or another type. The external sensors 132 and the internal sensors 134 may release signals (i.e., electrical, nuclear, or sonic) through a signal generator at a sensing processing element 136.

The movement system 140 may include one or more coordination elements 142 coupled to one or more translation elements 144. The coordination elements 142 may be tracking devices that provide the robotic device 100 with location awareness while moving on the ferrous asset 170. The coordination elements 142 may be physical relays that trigger a halt in the movement of the robotic device 100 when another system instructs a halting protocol. A halting protocol may occur when the processing system 120 identifies a condition that prevents movement of the robotic device 100. For example, the halting protocol may occur when a combination of the localization system 116 and the external sensors 132 identify that the robotic device 100 is approaching a prohibited location on the ferrous asset 170.

Figure 2B:
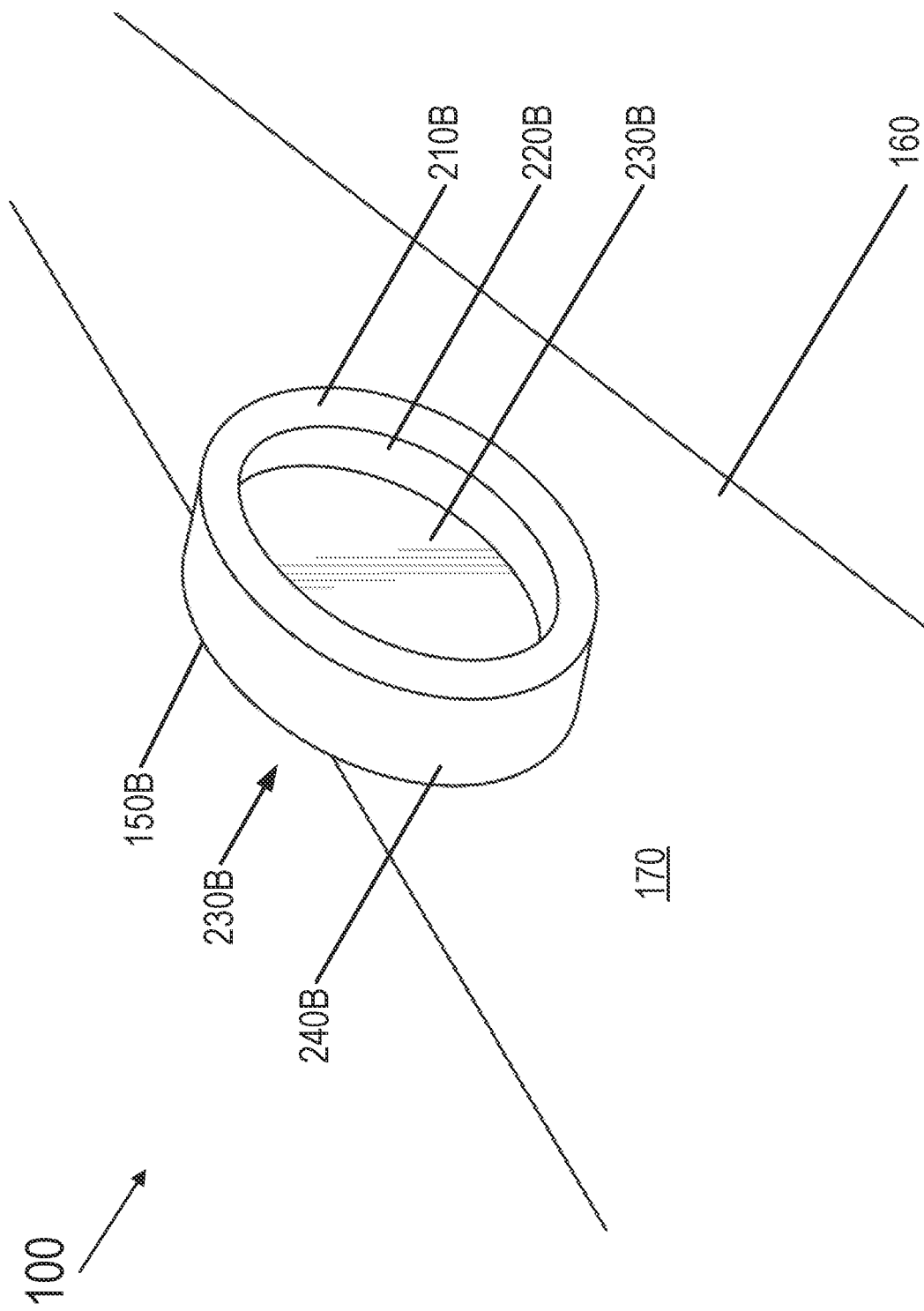
FIG. 2B shows a perspective view of a robotic device in accordance with one or more embodiments.
Figure 2C:
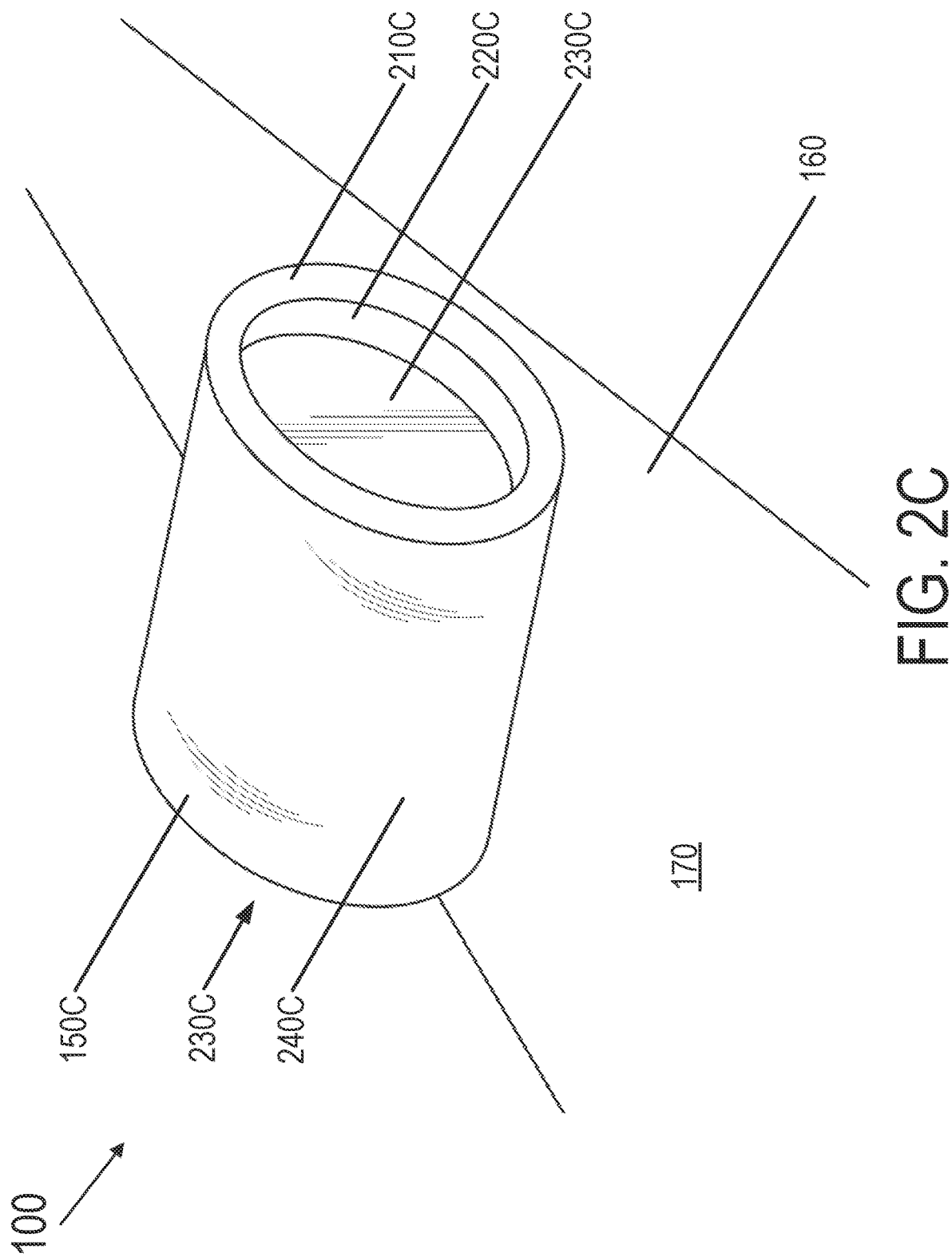
FIG. 2C shows a perspective view of a robotic device in accordance with one or more embodiments.

FIGS. 2A-2C show perspective views of a robotic device 100 having a housing 150 of three different types. FIG. 2A shows a spherical housing 150A having a single outer surface 210A. The spherical housing 150A provides the robotic device 100 with a smooth surface that allows movement of the robotic device 100 in any direction at any point during movement. FIG. 2B shows a wheel-like housing 150B having multiple outer surfaces 210B, 220B, 230B, and 240B. The wheel-like housing 150B provides the robotic device 100 with a smooth surface that allows movement of the robotic device 100 in a forward direction or a backward direction at any point during movement. The multiple outer surfaces may be located on each side of the robotic device 100. The multiple outer surfaces may include an outer rim 210B that holds an outer wall 240B to contact the surface 160 of the ferrous asset 170. The multiple outer surfaces may include a central plate 230B that covers the middle of the robotic device 100, and a side wall 220B that offsets the outer rim 210B with respect to the central plate 230B. Similarly, FIG. 2C shows a rod-like housing 150C having multiple outer surfaces 210C, 220C, 230C, and 240C. The rod-like housing 150C provides the robotic device 100 with a smooth surface that allows movement of the robotic device 100 in a forward direction or a backward direction at any point during movement. The multiple outer surfaces may be located on each side of the robotic device 100. The multiple outer surfaces may include an outer rim 210C that holds an outer wall 240C to contact the surface 160 of the ferrous asset 170. The multiple outer surfaces may include a central plate 230C that covers the middle of the robotic device 100, and a side wall 220C that offsets the outer rim 210C with respect to the central plate 230C.

Figure 3B:
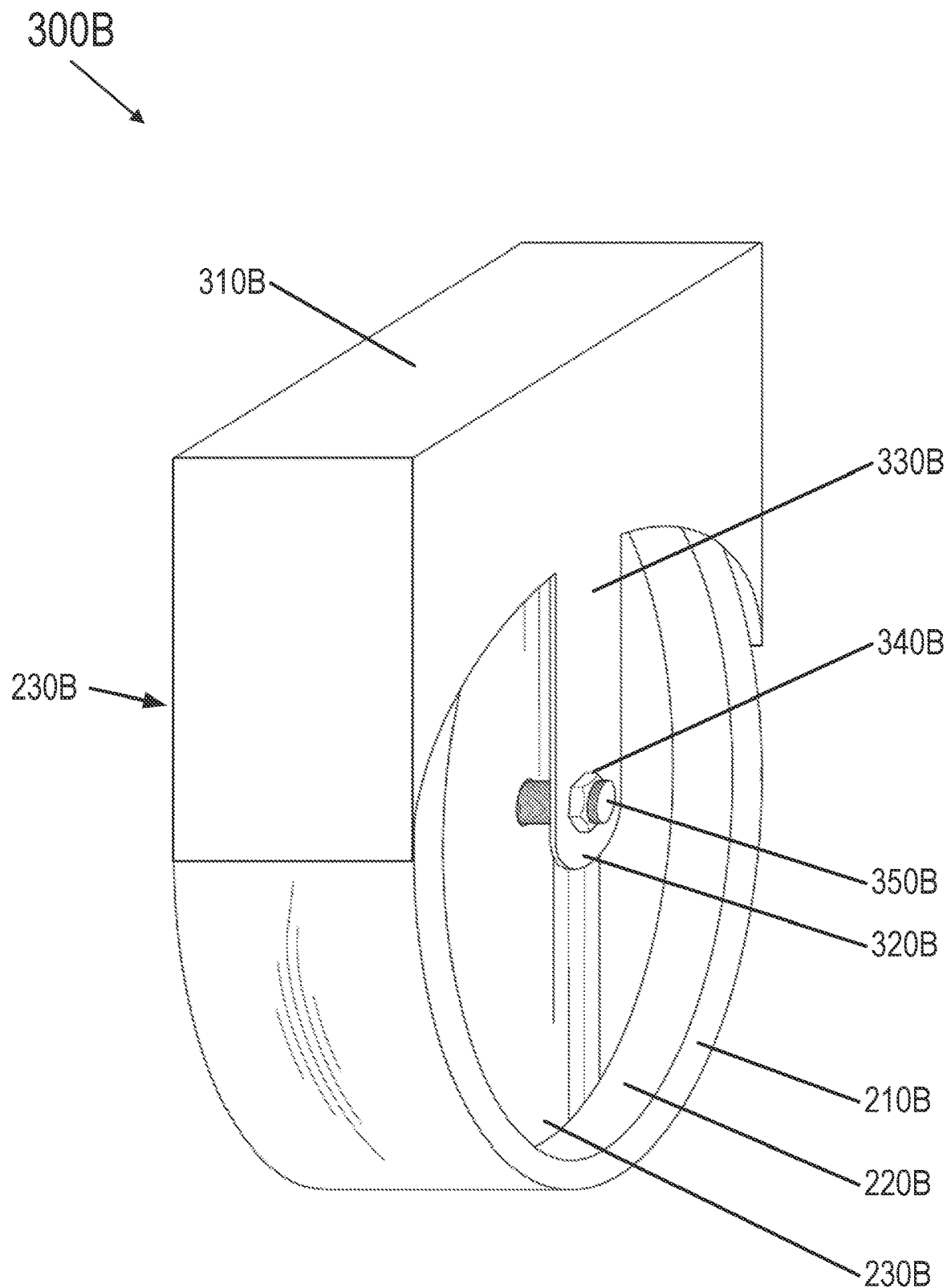
FIG. 3B shows a perspective of a robotic assembly in accordance with one or more embodiments.
Figure 3C:
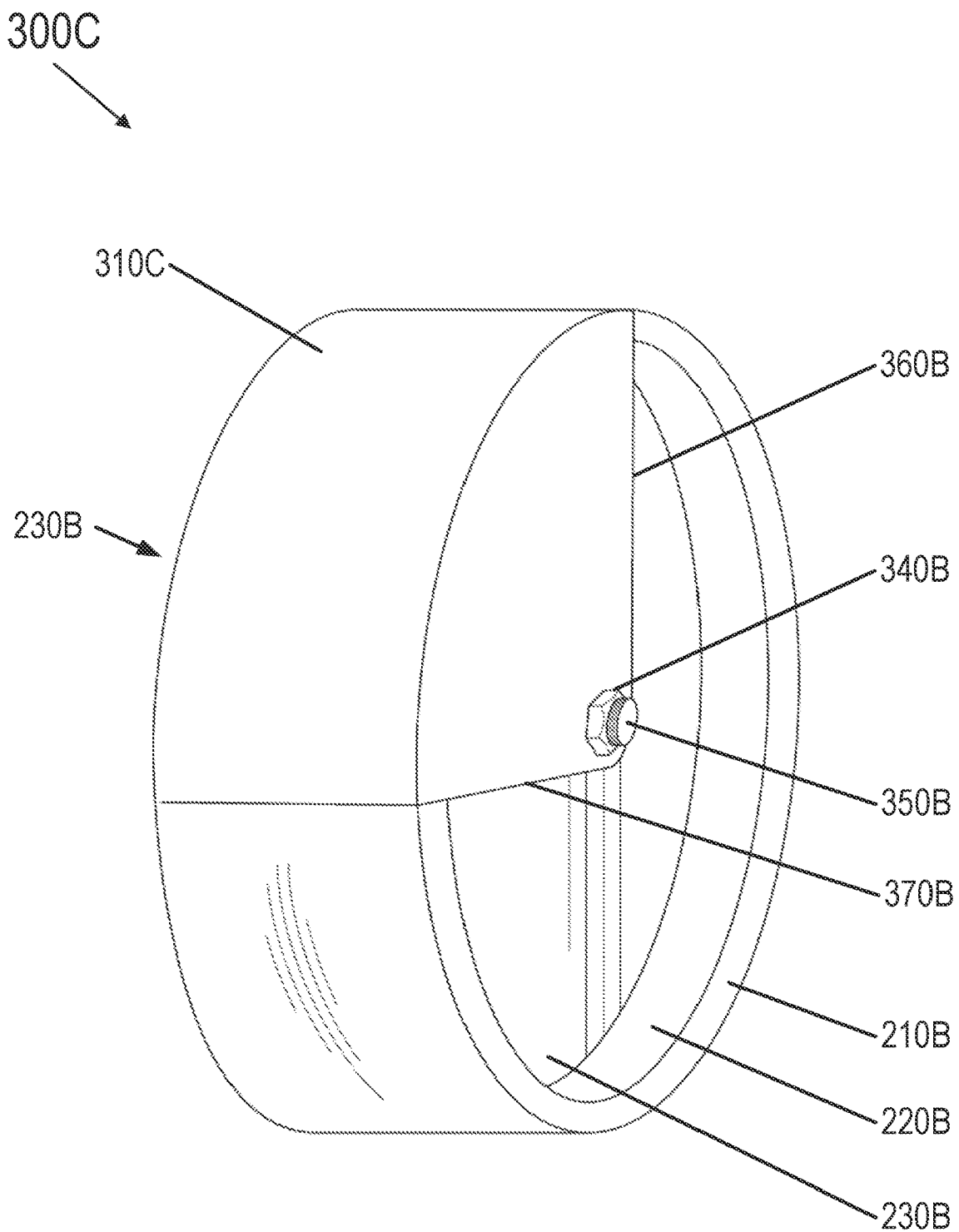
FIG. 3C shows a perspective of a robotic assembly in accordance with one or more embodiments.

FIGS. 3A-3C show perspective views of robotic assemblies 300A, 300B, and 300C having housing-chassis combinations of three different types. FIG. 3A shows a robotic assembly 300A with the spherical housing 150A having the single outer surface 210A and coupled to a semi-circular chassis 310A. The semi-circular chassis 310A may be coupled to the spherical housing 150A through a clamping element 320A that holds the spherical housing 150A centered on the semi-circular chassis 310A. The clamping element 320A may be a through pin or a through bolt that goes across the center of the robotic device 100. FIG. 3B shows a robotic assembly 300B with the wheel-like housing 150B having the multiple outer surfaces 210B, 220B, 230B, and 240B and an outer rim chassis 310B. The outer rim chassis 310B may be coupled to the wheel-like housing 150B through a clamping element 320B that holds the wheel-like housing 150B centered on the outer rim chassis 310B. The outer rim chassis 310B may include an extension with a tongue 330B that overlaps the center of the robotic device 100. The clamping element 320B may be a nut 340B coupled to a bolt 350B that goes across the center of the robotic device 100. FIG. 3C shows a robotic assembly 300C with the wheel-like housing 150B having the multiple outer surfaces 210B, 220B, 230B, and 240B and a cover-up chassis 310C. The cover-up chassis 310C may be coupled to the wheel-like housing 150B through a clamping element 320B that holds the wheel-like housing 150B centered on the outer rim chassis 310B. The cover-up chassis 310C may include at least two ends 360B and 370B at respective sides of the center of the robotic device 100. Similar to FIG. 3B, the clamping element 320B in FIG. 3C may be a nut 340B coupled to a bolt 350B that goes across the center of the robotic device 100.

In one or more embodiments, the cover-up chassis 310C may cover a quarter of the wheel-like housing 150B. In one or more embodiments, the cover-up chassis 310C may cover half of the wheel-like housing 150B. Further, the cover-up chassis 310C may be used in combination with the wheel-like housing 150B or the rod-like housing 150C.

The clamping element 320A may be a pin or a bolt that limits the movement of the robotic assembly 300A for omni directions. In this case, to overcome any limitations caused by the location of the pin or the bolt, the spherical housing 150A may include a swivel wheel design that may be used to add another degree of freedom to the robotic assembly 300A. Thus, instead of coupling the spherical housing 150A with the pin or the bolt, the spherical housing 150A may be coupled magnetically to the semi-circular chassis 310A, with additional magnets attached to the chassis. The magnetic properties of the chassis will be described in more detail in reference to FIGS. 7A-7C.

In one or more embodiments described in FIGS. 2A-3C, the direction of movement may be changed on the robotic device 100 by changing a polarity of one or more of the magnetic elements inside the robotic device 100. The behavior of the magnetic elements will be explained in more detail in FIGS. 5A-6C.

Figure 4A:
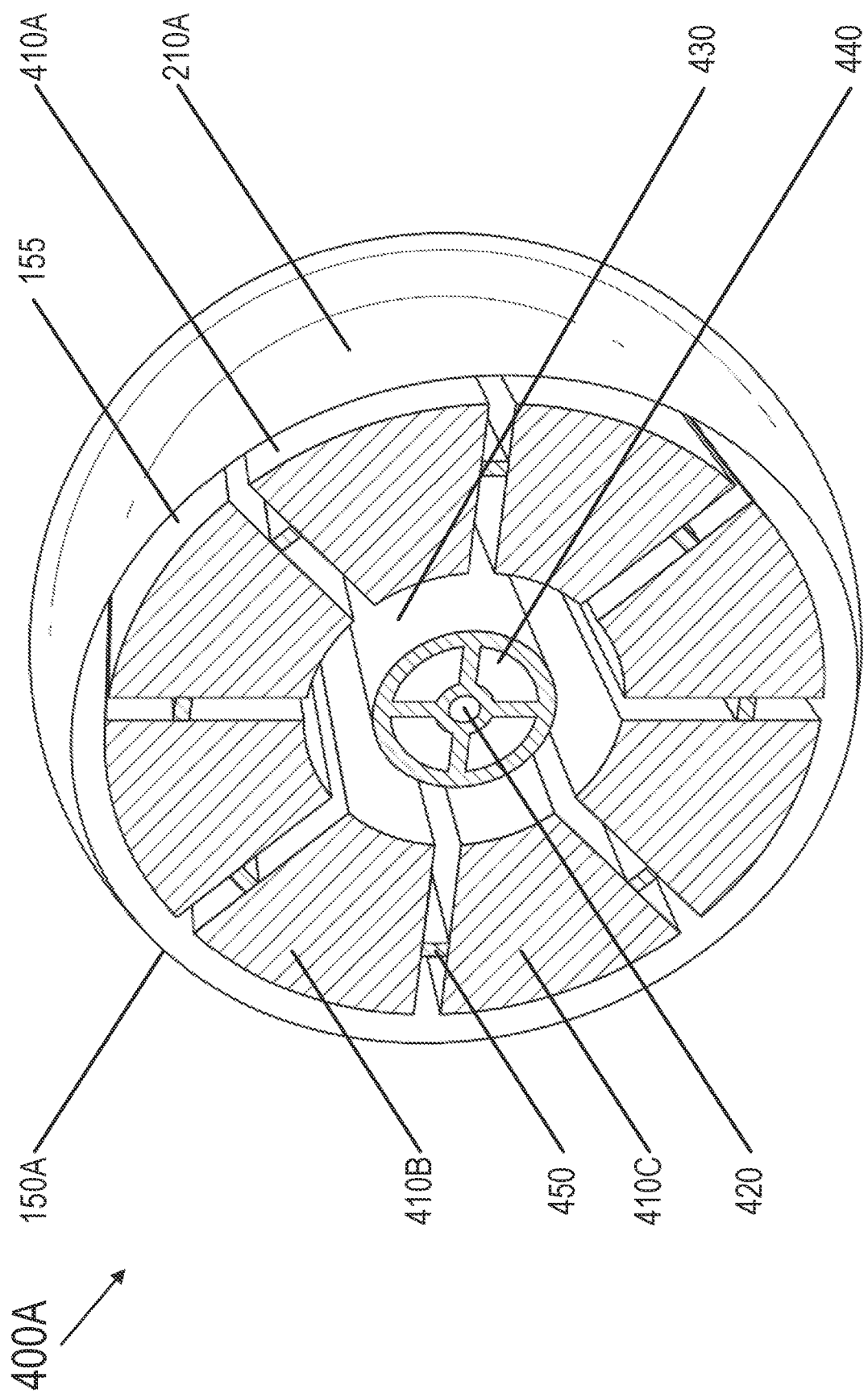
FIG. 4A shows a cross-section view of a robotic device in accordance with one or more embodiments.
Figure 4B:
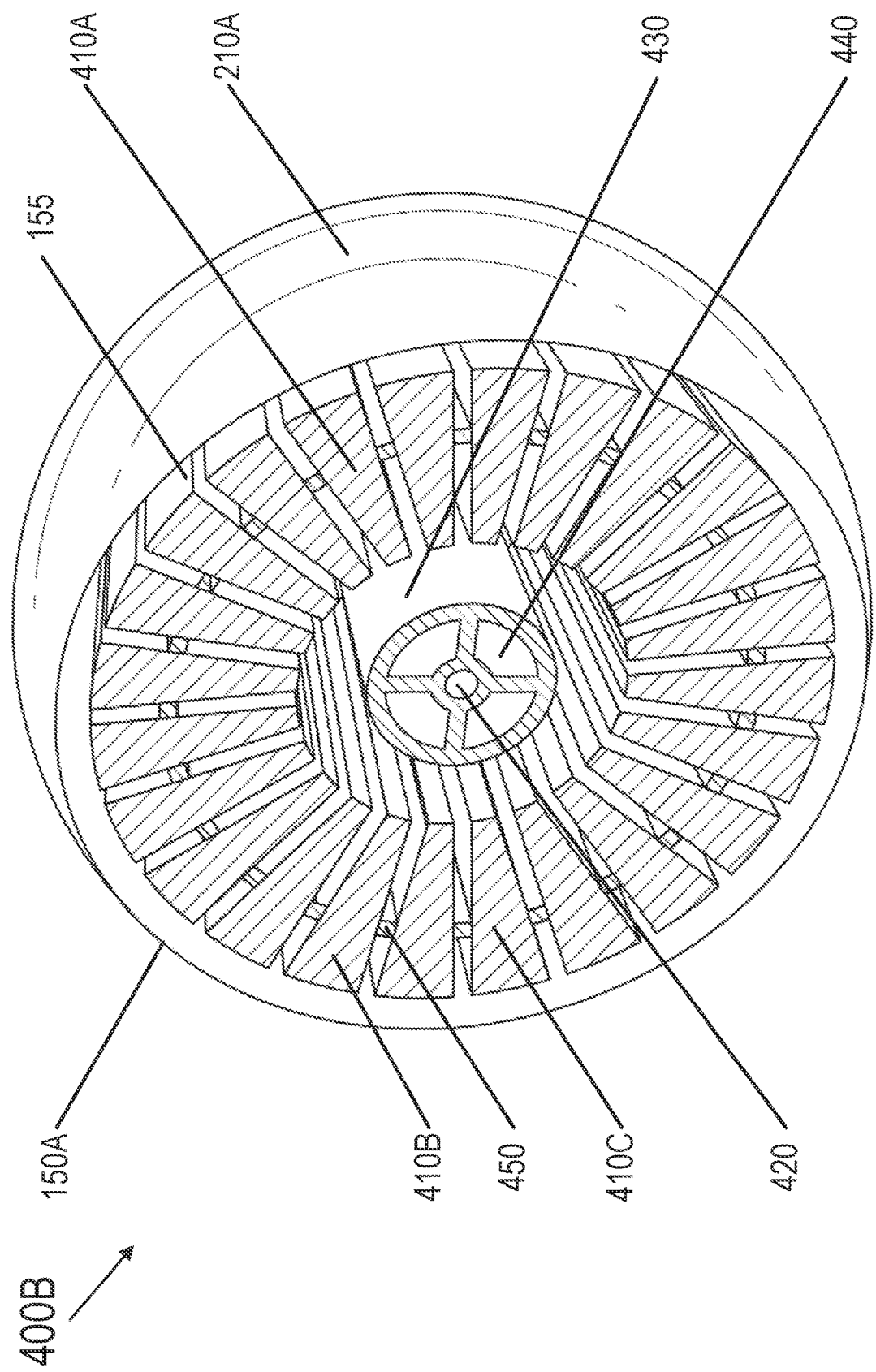
FIG. 4B shows a cross-section view of a robotic device in accordance with one or more embodiments.

FIG. 4A shows a cross-section view 400A of the robot device 100 having the wheel-like housing 150A with the multiple outer surfaces may include an outer rim 210A. The cross-section view 400A includes various magnetic elements 410A-410C located in the inner chamber 155 and arranged around the center 420. The magnetic elements 410A-410C may be connected through the power train 450 that connects all the magnetic elements 410A-410C to the system chambers 440 containing the systems 110, 120, 130, and 140 discussed in reference to FIG. 1. In FIG. 4A, the inner chamber 155 includes 8 distinct magnetic elements. Similarly, FIG. 4B shows a cross-section view 400B of the robot device 100 having the wheel-like housing 150A with the multiple outer surfaces may include an outer rim 210A. The cross-section view 400B includes various magnetic elements 410A-410C located in the inner chamber 155 and arranged around the center 420. The magnetic elements 410A-410C may be connected through the power train 450 that connects all the magnetic elements 410A-410C to the system chambers 440 containing the systems 110, 120, 130, and 140 discussed in reference to FIG. 1. In FIG. 4B, the inner chamber 155 includes 24 distinct magnetic elements.

Figure 4C:
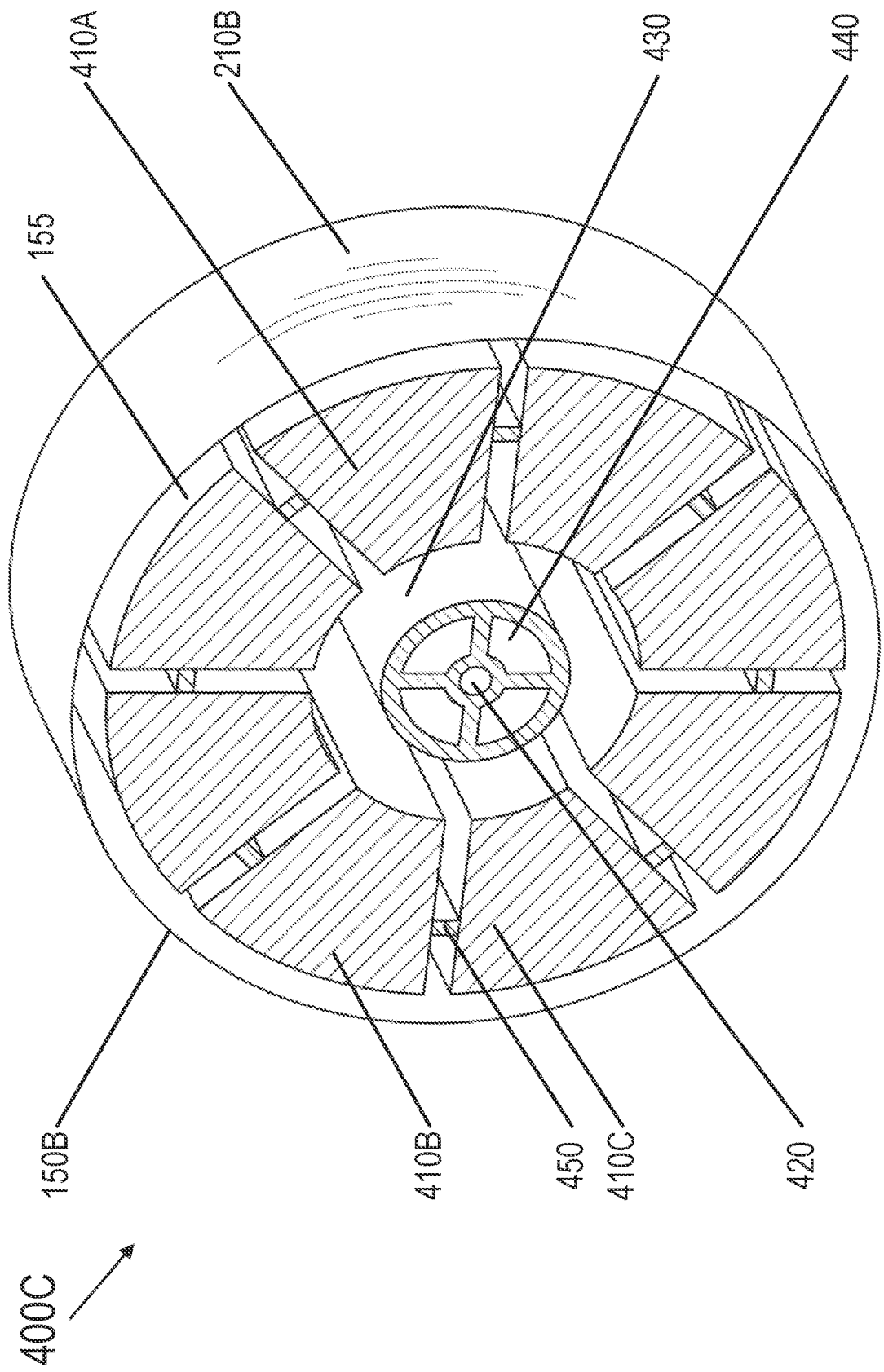
FIG. 4C shows a cross-section view of a robotic device in accordance with one or more embodiments.
Figure 4D:
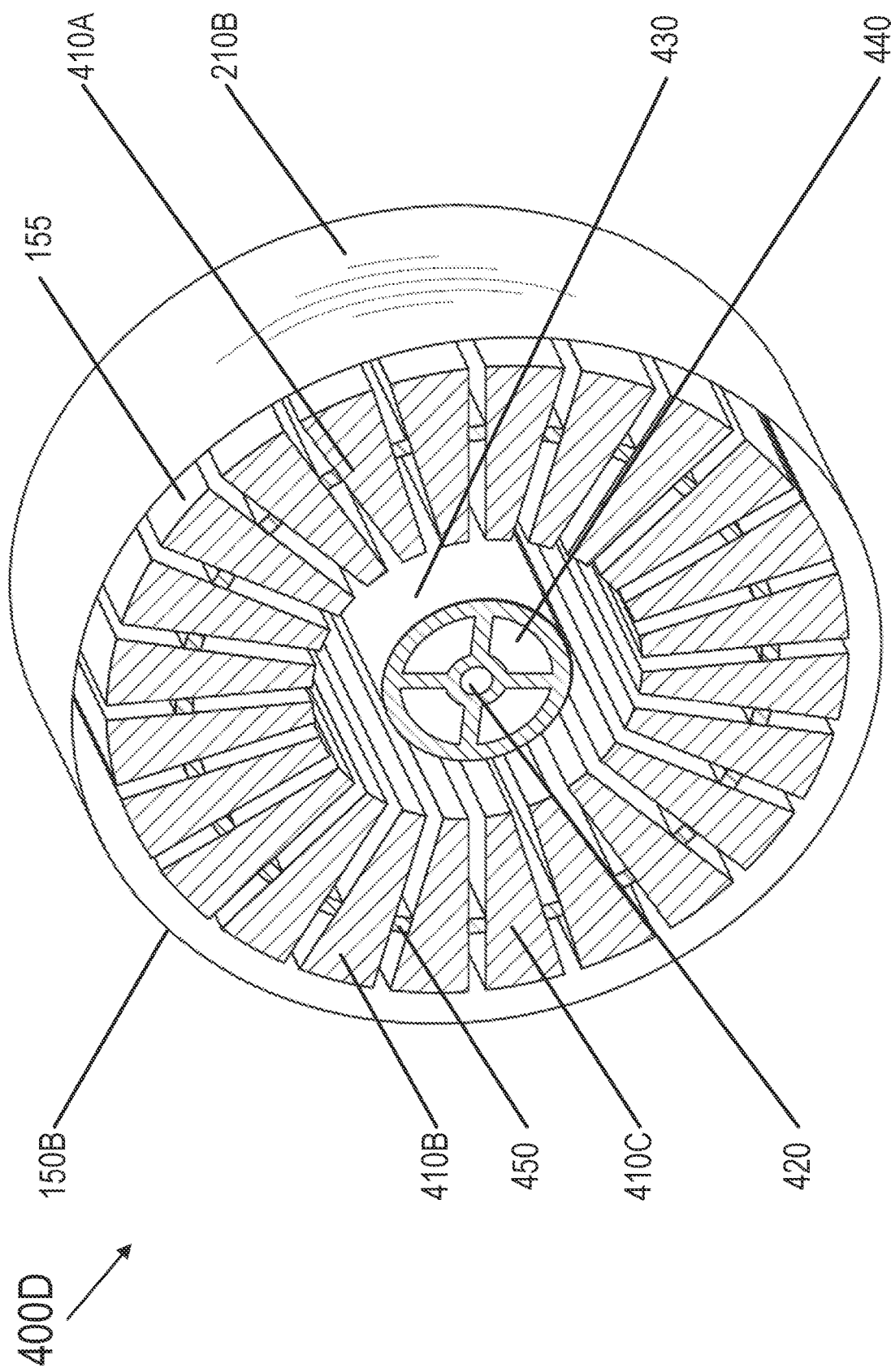
FIG. 4D shows a cross-section view of a robotic device in accordance with one or more embodiments.

FIG. 4C shows a cross-section view 400C of the robot device 100 having the wheel-like housing 150B with the multiple outer surfaces may include an outer rim 210B. The cross-section view 400C includes various magnetic elements 410A-410C located in the inner chamber 155 and arranged around the center 420. The magnetic elements 410A-410C may be connected through the power train 450 that connects all the magnetic elements 410A-410C to the system chambers 440 containing the systems 110, 120, 130, and 140 discussed in reference to FIG. 1. In FIG. 4C, the inner chamber 155 includes 8 distinct magnetic elements. Similarly, FIG. 4D shows a cross-section view 400D of the robot device 100 having the wheel-like housing 150B with the multiple outer surfaces may include an outer rim 210B. The cross-section view 400D includes various magnetic elements 410A-410C located in the inner chamber 155 and arranged around the center 420. The magnetic elements 410A-410C may be connected through the power train 450 that connects all the magnetic elements 410A-410C to the system chambers 440 containing the systems 110, 120, 130, and 140 discussed in reference to FIG. 1. In FIG. 4D, the inner chamber 155 includes 24 distinct magnetic elements.

In FIGS. 4A-4D, the system chambers 440 may located at the center of the inner chamber 155 and disposed around the center 420. The inner chamber 155 may include a spacing 430 between the magnetic elements and the system chambers 440. The spacing 430 may include insulation filling that prevents the magnetic elements from affecting the operations of the electronic components disposed in the system chambers 440.

Figure 5A:
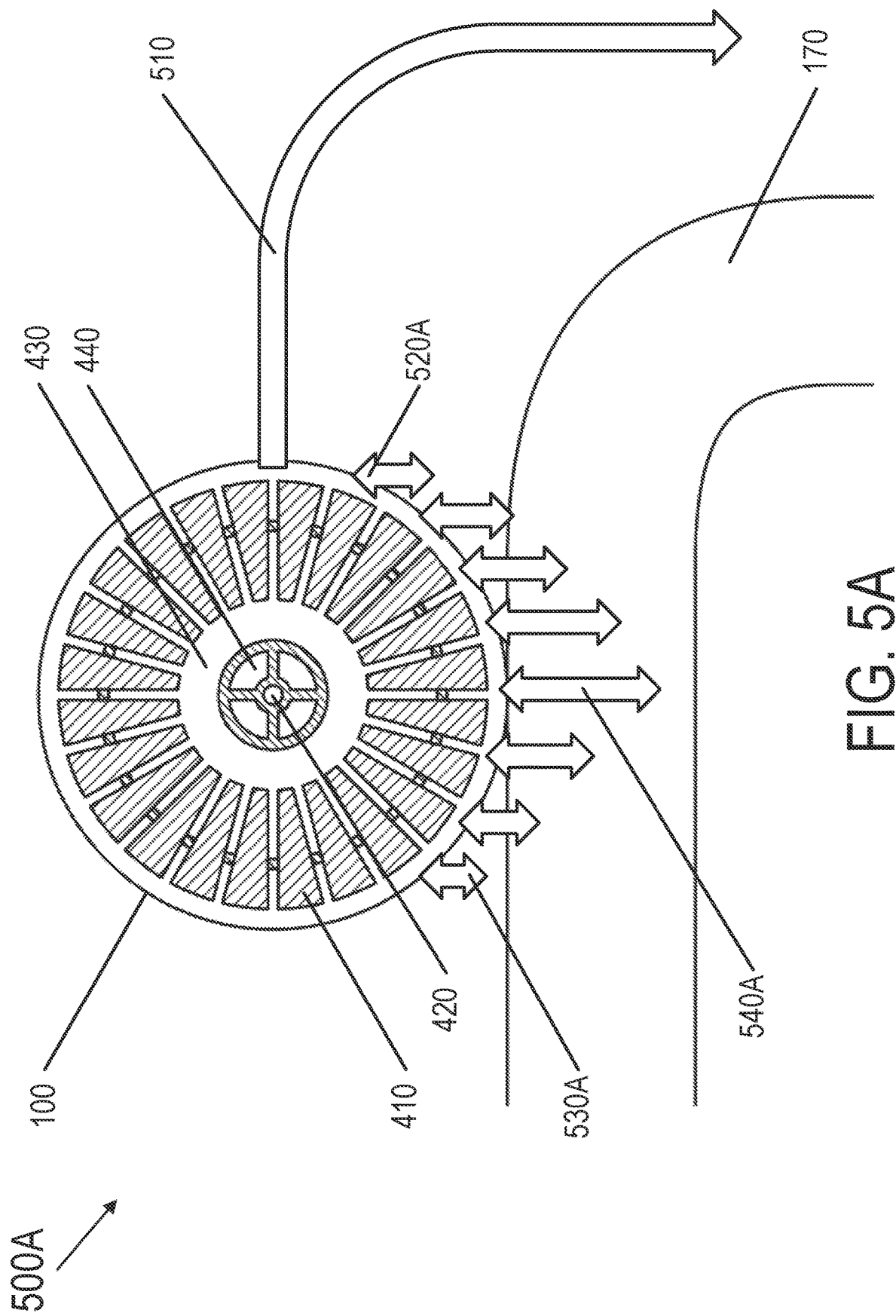
Figure 5C:
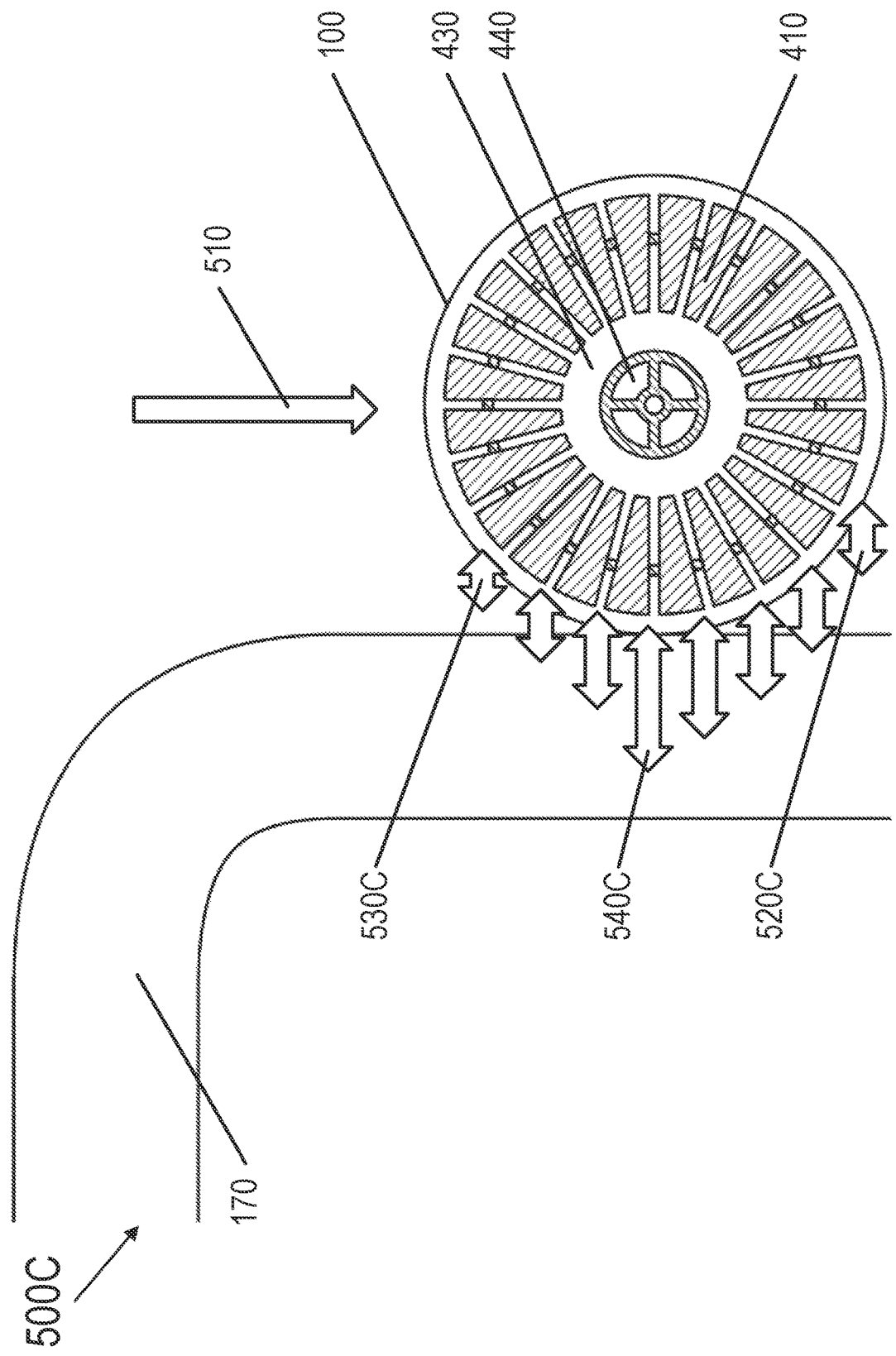

FIGS. 5A-5C show side cross-section views 500A, 500B, and 500C of the robotic device 100 overcoming an obstacle (i.e., an outside of a bending portion) on the ferrous asset 170. In FIGS. 5A-5C, 24 magnetic elements 410 are disposed around the center 420 and the system chambers 440. The center 420 and the system chambers 440 may be separated from the magnetic elements 410 by the spacing 430.

FIG. 5A shows a cross-section view 500A in which the robotic device 100 is located at a starting position before moving around the obstacle of the ferrous asset 170. The ferrous asset 170 may be a metallic pipe or tube. In this case, the system chambers 440 evaluate the surroundings of the robotic device 100 upon receiving an instruction for movement in a direction of motion 510. In a stationary position, the system chambers 440 are configured to maximize the magnetic force 540A at the magnetic element located closest to the ferrous asset 170. Once movement is triggered, the rest of the magnetic elements may be energized at individual magnetic strengths corresponding to each magnetic element individually. At this point, the frontmost magnetic element may be powered with a magnetic force 520A that causes the robotic device 100 to roll forward. As the robotic device 100 moves away from the starting point, the magnetic force 540A may be reduced gradually to a magnetic force 530A that is the last magnetic force used before completely cancelling magnetic strength such that the robotic device 100 may move in the direction of motion 510 without detaching from the ferrous asset 170.

FIG. 5B shows a cross-section view 500B in which the robotic device 100 is located at a moving position around the obstacle of the ferrous asset 170. In this case, the system chambers 440 evaluate the surroundings of the robotic device 100 upon continuing the movement in the direction of motion 510. As the movement continues, the magnetic elements 410 may be energized at individual magnetic strengths corresponding to each magnetic element individually. At this point, the frontmost magnetic element may be powered with a magnetic force 520B that causes the robotic device 100 to continue rolling forward. As the robotic device 100 moves away from the starting point, the magnetic force 540B may be reduced gradually to a magnetic force 530B that is the last magnetic force used before completely cancelling magnetic strength such that the robotic device 100 may move in the direction of motion 510 without detaching from the ferrous asset 170 by changing the magnetization of the magnetic elements 410 at a faster rate. In this regard, changing the magnetization of the magnetic elements 410 includes increasing, reducing, or maintaining the magnetic strength of the magnetic elements 410.

FIG. 5C shows a cross-section view 500C in which the robotic device 100 is located at an ending position after moving around the obstacle of the ferrous asset 170. In this case, the system chambers 440 evaluate the surroundings of the robotic device 100 upon continuing movement in the direction of motion 510. As the movement continues, the magnetic elements 410 may be energized at individual magnetic strengths corresponding to each magnetic element individually. At this point, the frontmost magnetic element may be powered with a magnetic force 520C that causes the robotic device 100 to roll forward. As the robotic device 100 moves away from the starting point, the magnetic force 540C may be reduced gradually to a magnetic force 530C that is the last magnetic force used before completely cancelling magnetic strength such that the robotic device 100 may continue moving in the direction of motion 510 without detaching from the ferrous asset 170.

FIGS. 6A-6C show side cross-section views 600A, 600B, and 600C of the robotic device 100 overcoming an obstacle (i.e., an inside of a bending portion) on the ferrous asset 170. In FIGS. 6A-6C, 24 magnetic elements 410 are disposed around the center 420 and the system chambers 440. The center 420 and the system chambers 440 may be separated from the magnetic elements 410 by the spacing 430.

FIG. 6A shows a cross-section view 600A in which the robotic device 100 is located at a starting position before moving around the obstacle of the ferrous asset 170. The ferrous asset 170 may be a metallic pipe or tube. In this case, the system chambers 440 evaluate the surroundings of the robotic device 100 upon receiving an instruction for movement in a direction of motion 510. In a stationary position, the system chambers 440 are configured to maximize the magnetic force 640A at the magnetic element located closest to the ferrous asset 170. Once movement is triggered, the rest of the magnetic elements may be energized at individual magnetic strengths corresponding to each magnetic element individually. At this point, the frontmost magnetic element may be powered with a magnetic force 620A that causes the robotic device 100 to roll forward. As the robotic device 100 moves away from the starting point, the magnetic force 640A may be reduced gradually to a magnetic force 630A that is the last magnetic force used before completely cancelling magnetic strength such that the robotic device 100 may move in the direction of motion 610 without detaching from the ferrous asset 170.

FIG. 6B shows a cross-section view 600B in which the robotic device 100 is located at a moving position around the obstacle of the ferrous asset 170. In this case, the system chambers 440 evaluate the surroundings of the robotic device 100 upon continuing the movement in the direction of motion 610. As the movement continues, the magnetic elements 410 may be energized at individual magnetic strengths corresponding to each magnetic element individually. At this point, the frontmost magnetic element may be powered with a magnetic force 620B that causes the robotic device 100 to continue rolling forward. As the robotic device 100 moves away from the starting point, the magnetic force 640B may be reduced gradually to a magnetic force 630B that is the last magnetic force used before completely cancelling magnetic strength such that the robotic device 100 may move in the direction of motion 610 without detaching from the ferrous asset 170 by changing the magnetization of the magnetic elements 410 at a faster rate. As noted above, changing the magnetization of the magnetic elements 410 includes increasing, reducing, or maintaining the magnetic strength of the magnetic elements 410.

FIG. 6C shows a cross-section view 600C in which the robotic device 100 is located at an ending position after moving around the obstacle of the ferrous asset 170. In this case, the system chambers 440 evaluate the surroundings of the robotic device 100 upon continuing movement in the direction of motion 610. As the movement continues, the magnetic elements 610 may be energized at individual magnetic strengths corresponding to each magnetic element individually. At this point, the frontmost magnetic element may be powered with a magnetic force 620C that causes the robotic device 100 to roll forward. As the robotic device 100 moves away from the starting point, the magnetic force 640C may be reduced gradually to a magnetic force 630C that is the last magnetic force used before completely cancelling magnetic strength such that the robotic device 100 may continue moving in the direction of motion 610 without detaching from the ferrous asset 170.

Magnetic force is affected by distance, temperature, and contact area. As such, in some embodiments, having the magnetic elements 410 around the circumference decreases a distance between each magnetic element and the ferrous surface 160 thus increasing the magnetic force. Further, in some embodiments, the robotic device 100 having the housing 150 shaped as a wide wheel increases a contact area with the ferrous surface 160 resulting in stronger magnetic forces. In addition, in some embodiments, increasing the number of magnetic elements 410 increases the movement precision of the magnetic force. In this regard, more magnetic elements 410 increase the density of the magnetic field and increase the magnetic force being applied.

A flexible microcontroller may be used to fit inside the system chambers 440 of the robotic device 100. In this regard, having the flexible microcontroller reduces the distance between the magnetic elements 410 and the flexible microcontroller and reduces wiring and weight. The microcontroller may be used to control the magnetic elements 410 inside the robotic device 100 without requiring remote transmissions of commands to the robotic device 100. Because the magnetic force can be controlled and programmed, the robotic device 100 may adjust the magnetic force to operate in various surface types and temperature conditions. Simultaneously, the magnetic elements 410 may be used as a magnetic force sensor to detect magnetic forces on the wheel.

To improve the power consumption and the combined weight of the robotic device 100, the magnetic elements 410 may include switchable holding electromagnets instead of permanent magnets. Switchable holding electromagnets may allow for the robotic device 100 to be opened for servicing when one of the electromagnetic elements malfunctions. In some embodiments, making a sharp turn may be obtained by changing the polarity of the magnetic elements 410 using additional magnetic elements disposed on the chassis that can be controlled to allow for the rotation around a vertical axis of the wheel. Alternatively, a motor may be used for this type of control.

Figure 7A:
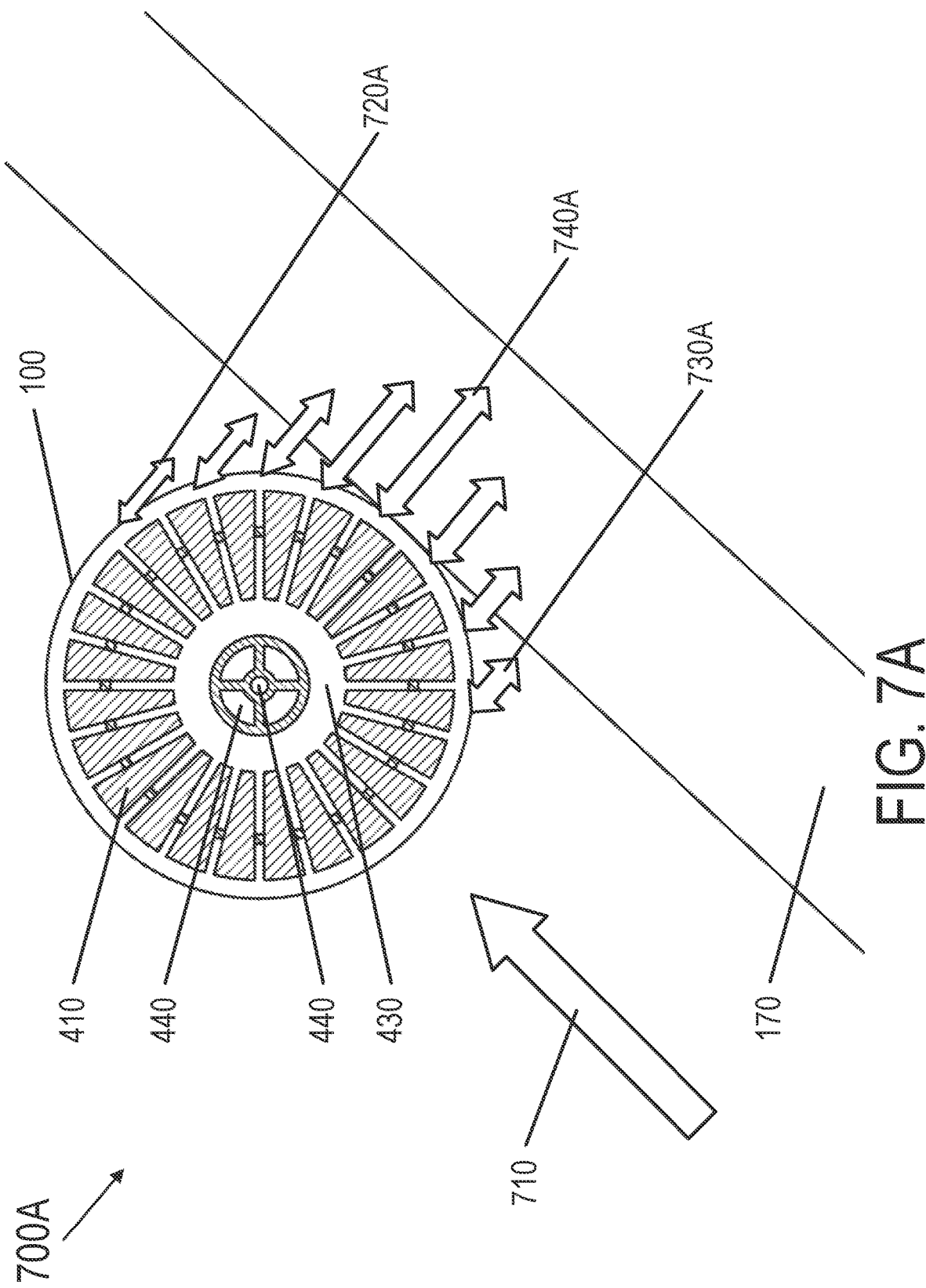

In some embodiments, FIGS. 7A-7C show that the robotic device 100 may be adapted for a specific application. Depending on the application the robotic device 100 may be a standalone robot or it may be used as a wheel for a robotic assembly 300. When used as a standalone robot, the robotic device 100 may have its own power and control enclosed in the housing 150 in the manner described in reference to FIG. 1. When used as a wheel for the robotic assembly 300, various robotic devices may be attached side by side to increase the magnetic force onto the ferrous surface 170, if needed. In one or more embodiments, the chassis is used to provide a standalone robotic wheel with additional magnetic strength. If the material of the housing 150 is ferromagnetic, the magnetic field may travel through it to increase the strength of the magnetic elements. In some embodiments, multiple standalone robotic wheel may be paired with one another to increase an overall magnetic force of the chassis.

FIG. 7A shows a cross-section view 700A in which the robotic device 100 is moving on the ferrous asset 170. The robotic device is moving by applying the largest magnetic force 720A at the frontmost magnetic element and causing a rotation in the manner discussed in FIGS. 5A-6C. As the robotic device 100 moves in a direction of movement 710, the magnetic force 720A becomes the magnetic force 740A, which allows the robotic device 100 to remain attached to the ferrous asset 170 during movement. Once the robotic wheel 100 has moved to trigger the magnetic force change, a subsequent magnetic force change occurs by changing the magnetic force 740A into magnetic force 730A as the robotic device proceeds in the direction of motion 710.

FIG. 7B shows a cross-section view 700B in which the robotic assembly 300 is moving on the ferrous asset 170. The assembly 300B includes the robotic device 100 coupled to a chassis 750B. The chassis 750B includes additional magnetic elements 790 that induce magnetic forces onto the magnetic elements 410 of the robotic device 100. In this case, when the direction of motion 710 is triggered and motion starts, the additional magnetic elements 790 are actuated to cause rotation of the robotic device in the direction of motion 710. As shown in FIG. 7B, a magnetic force 780B starts the movement of the robotic wheel 100. A spread of magnetic forces ranging between 760B, 770B, and 780B cause the magnetic elements 410 to rotate the robotic device 100 in the direction of motion 710 by maintaining the magnetic forces 720B, 730B, and 740B in the manner discussed in the magnetic forces with respect to FIG. 7A. The magnetic forces 760B, 770B, and 780B in the additional magnetic elements 790 cause the magnetic strengths 720B, 730B, and 740B in the magnetic elements 410 to attach the robotic device 100 to the ferrous asset 170.

FIG. 7C shows a cross-section view 700C in which the robotic assembly 300C is moving on the ferrous asset 170. The assembly 300C includes the robotic device 100 coupled to a chassis 750C. The chassis 750C includes additional magnetic elements 790 that induce magnetic forces onto the magnetic elements 410 of the robotic device 100. In this case, when the direction of motion 710 is triggered and motion starts, the additional magnetic elements 790 are actuated to cause rotation of the robotic device in the direction of motion 710. As shown in FIG. 7C, a magnetic force 780C starts the movement of the robotic wheel 100. A spread of magnetic forces ranging between 760C, 770C, and 780C cause the magnetic elements 410 to cause attraction of the robotic wheel 100 onto the ferrous asset 170. This attraction rotates the robotic device 100 around its lateral axis and in the direction of motion 710 by maintaining the magnetic forces 720C, 730C, and 740C of the wheel with respect to the magnetic element in the chassis, in the manner discussed in the magnetic forces with respect to FIG. 7A. The magnetic forces 760C, 770C, and 780C in the additional magnetic elements 790 cause the magnetic strengths 720C, 730C, and 740C in the magnetic elements 410 to attach the robotic device 100 to the ferrous asset 170. In one or more embodiments, the robotic assembly 300C includes an additional system chamber 795 that may supplement or replace the functionality of the system chambers 440 the robotic device 100.

As shown in FIGS. 7B and 7C, attraction between the wheel and the chassis is shown. This force can be used to attach the robotic device 100 to the chassis if designed without the need for a pin or bolt. In this regard, rotation of the robotic device 100 around its lateral axis may require the manipulation of the polarity of the magnetic element in the robotic device 100 with respect to the magnetic elements in the chassis.

In one or more embodiments, chassis 750B and chassis 750C may be a portion of a larger device or assembly. The larger device or assembly may be a scanning device that performs one or more scanning/testing operations. In this regard, a same chassis may be shared by two or more robotic devices.

Figure 8:
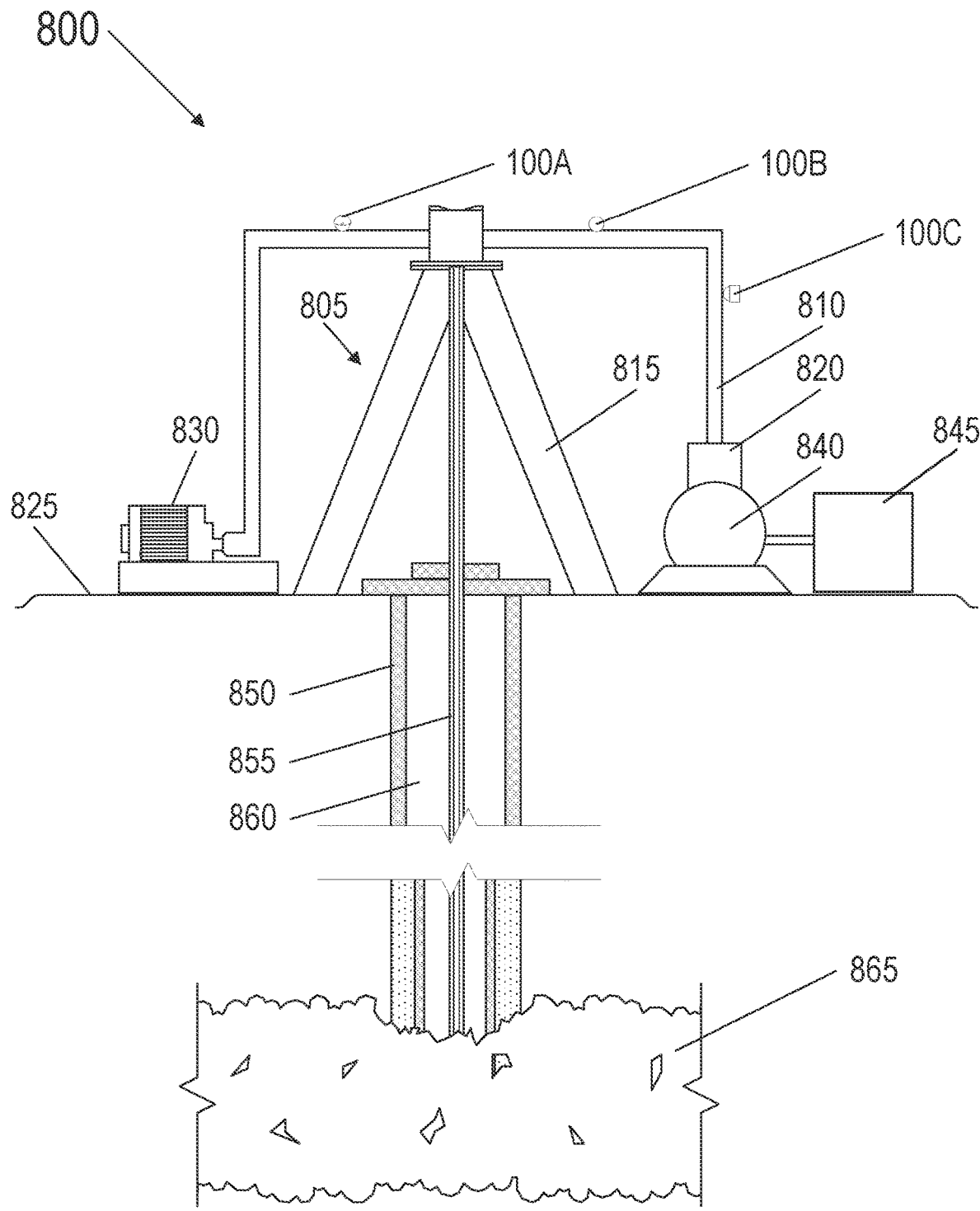
FIG. 8 shows an example of a well site in accordance with one or more embodiments.

FIG. 8 shows an example of moving robotic device 100B and robotic assemblies 100A and 100C on a well site 800 in accordance with one or more embodiments. The robotic assemblies may include a combination of a chassis 310A or a chassis 310B and a robotic device 100. The well site 800 may include surface equipment 805 including actuating devices 830, sensors 820, the control system 840, and an operation hub 845 connected to one another using hardware and/or software to create interfaces 810. Further, the well site 800 may be propped by structures 815 from the surface 825. The well site 800 subterranean section in which a wellbore 860 expands from the surface 825 to a hydrocarbon pool formation (i.e., the formation) 865. The wellbore 850 may include wellbore casing 850 surrounding tubing 855 used in the process of extracting hydrocarbons from the formation 865.

The well site 800 may include the control system ("control system") 840. In some embodiments, during operation of the well site 800, the control system 840 may collect and record wellhead data for the well site 800. In some embodiments, the control system 840 may regulate the movement of the tubing 855 by modifying the power supplied to the actuating devices 830.

The operation hub 845 may include a laboratory equipment room (not shown). The laboratory equipment room may include hardware and/or software with functionality for coordinating the movement of one or more robotic devices and/or the robotic assemblies 100A-100C. Further, the laboratory equipment room may include a memory device for storing formation logs and data regarding movement of the robotic devices and/or the robotic assemblies 100A-100C. While the laboratory equipment room may be coupled to the control system 840, the laboratory equipment room may be located away from the well site 800. In some embodiments, the laboratory equipment room may include a computer system disposed to track movement of the robotic devices and/or the robotic assemblies 100A-100C at any given time. The laboratory equipment room may use the memory for compiling and storing historical data about the movement of the robotic devices and/or the robotic assemblies 100A-100C.

In some embodiments, the actuating devices 830 may be motors or pumps connected to the tubing 855 and the control system 840. In some embodiments, the measurements are recorded in real-time, and are available for review or use within seconds, minutes or hours of the condition being sensed (e.g., the measurements are available within 1 hour of the condition being sensed). In such an embodiment, the wellhead data may be referred to as "real-time" wellhead data. Real-time data may enable an operator of the well site 800 to assess a relatively current state of the well site 800 and make real-time decisions regarding development of the well site 800 and the formation 865.

Figure 9:
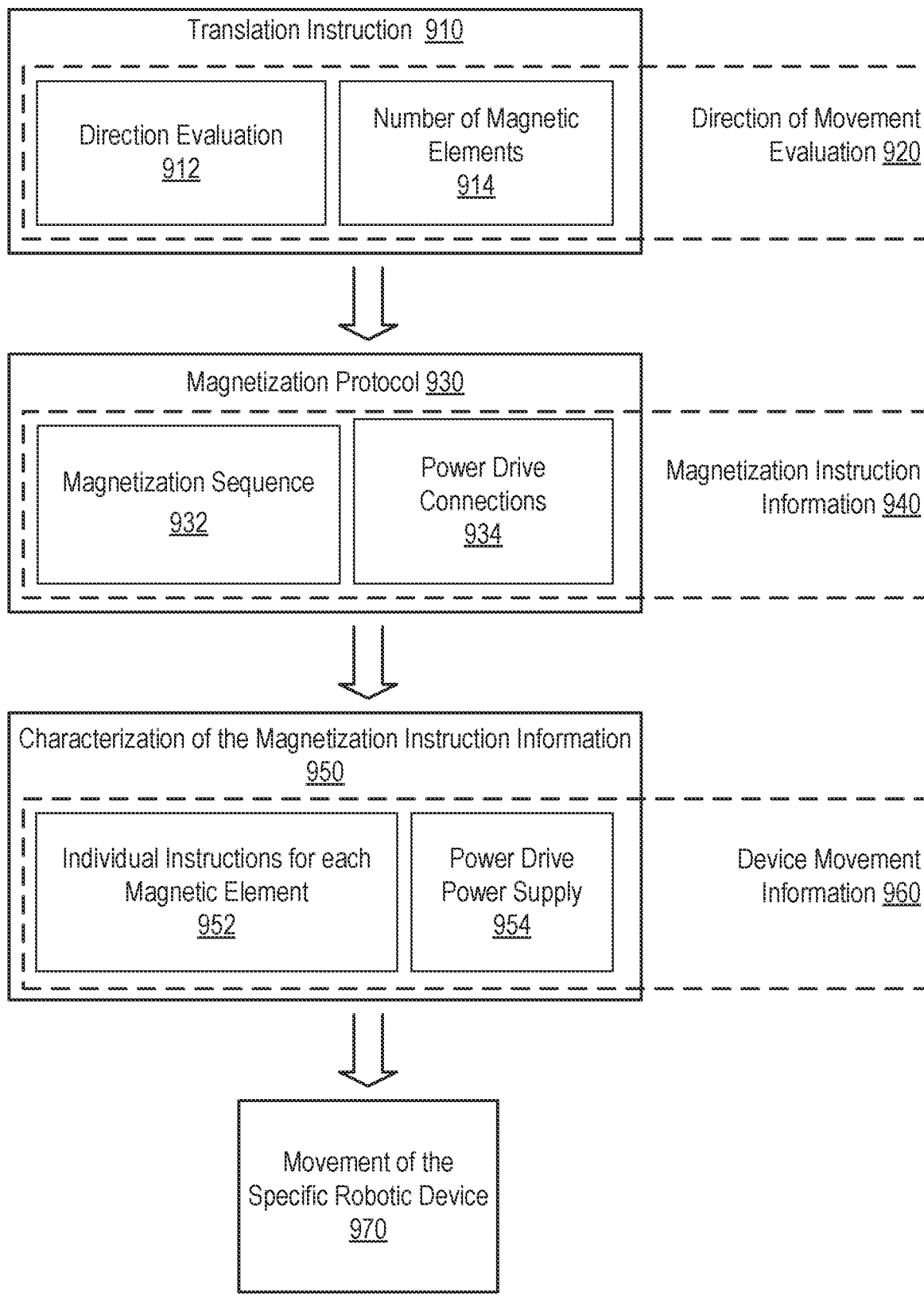
FIG. 9 shows an example of a movement determination process in accordance with one or more embodiments.

FIG. 9 shows a schematic diagram for an example in accordance with one or more embodiments. In one or more embodiments, the method and the system include a new scheme for moving a robotic device 100 or a robotic assembly 300. The method and the system may process measured physical phenomena to determine moving instructions for the robotic device 100 or the robotic assembly 300 in a direction of motion.

In some embodiments, the process starts by obtaining a translation instruction 910 in which a direction of movement and a specific robotic device are identified by performing a direction of movement evaluation 920. At this stage, a direction evaluation 912 is performed to identify whether the specific robotic device is allowed to move. Simultaneously, a number of magnetic elements 914 is sampled to determine whether the specific robotic device may move at a specific speed.

In some embodiments, a magnetization protocol 930 is started upon determining that the specific robotic device is allowed to move in the direction of motion and identifying that the specific device has the capability to move in the direction of motion. The magnetization protocol 930 derives a magnetization sequence 932 that determines a sequence for magnetizing individual magnetic elements in the specific robotic device. To energize the individual magnetic elements at individual magnetic forces, the magnetization protocol 910 samples power drive connections 934 in the specific robotic device. The magnetization protocol 930 is used to create magnetization instruction information 940 including a number of instructions required to move the specific robotic device by magnetizing, demagnetizing or maintaining a specific magnetization of the magnetization elements.

In some embodiments, characterization of the magnetization instruction information 950 starts by transmitting instructions to the systems chambers of the specific robotic device to prepare device movement information 960 to move the specific robotic device in the direction of motion. Preparation of this information includes preparing individual instructions for each magnetic element 952 and providing a power drive power supply 954 to allow continuous implementation of the magnetization protocol 930 to start movement of the specific robotic device 970.

Figure 10:
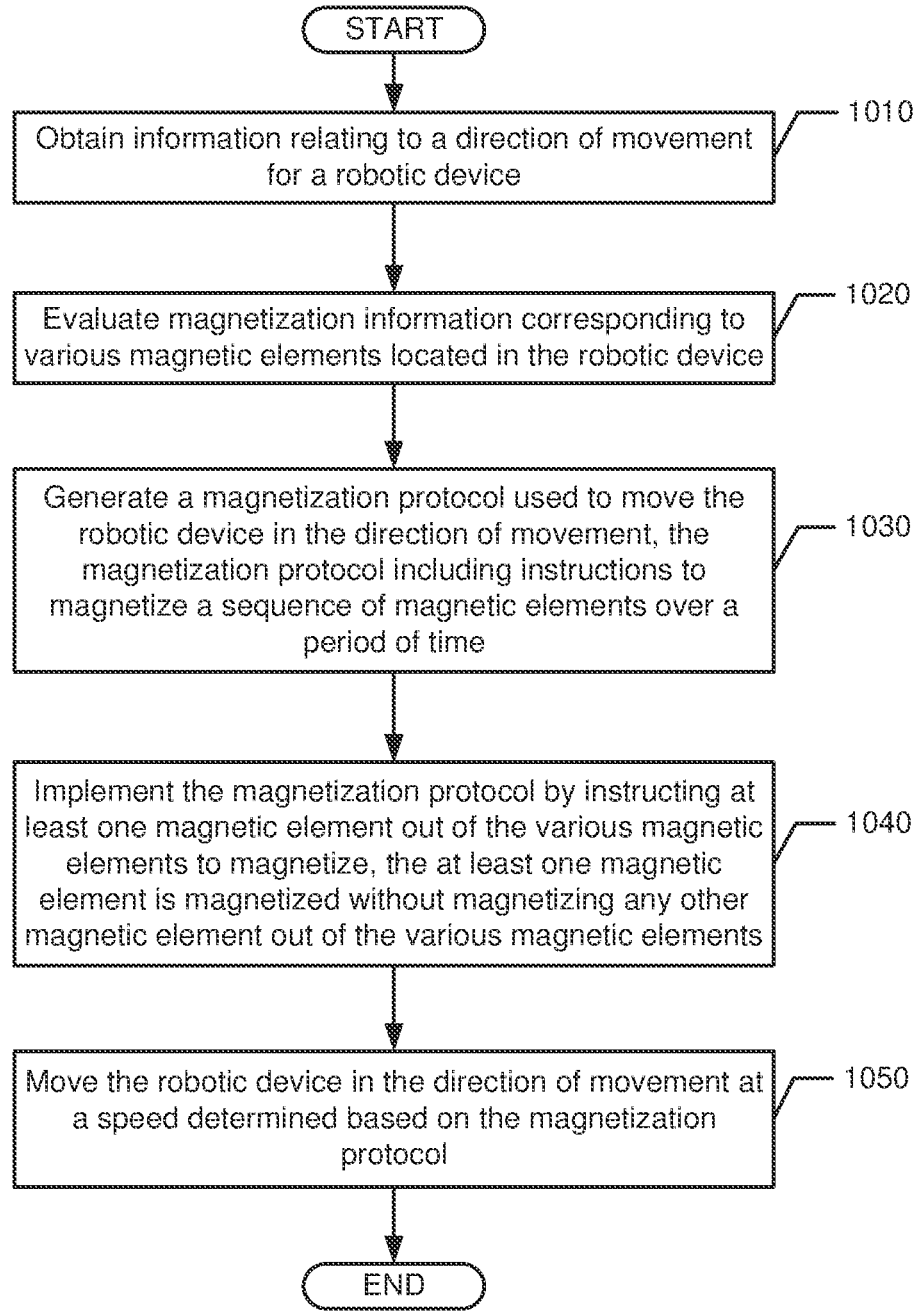
FIG. 10 shows a flowchart in accordance with one or more embodiments.

FIG. 10 shows a flowchart in accordance with one or more embodiments. Specifically, FIG. 10 describes a method for moving the robotic device 100. In some embodiments, the method may be implemented using the robotic device 100 described in reference to FIGS. 1-9. While the various blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1010, information relating to a direction of movement for the robotic device 100 is obtained. The robotic device 100 may receive the information in real-time to be re-programmed depending on a type of application. For example, a semi-autonomous robot or controlled robots may receive information provided by an operator. For autonomous robots, the information may be provided using an external sensor with periodic check ups on specific location. In these cases, the magnetic elements receive commands and power from robotic device 100 itself in the manner described in FIG. 1.

In Block 1020, magnetization information is evaluated corresponding to the various magnetic elements located in the robotic device. To test magnetization instructions, the robotic device 100 may be equipped with sensors to aid in verification such as an array of small force gauges, pressure sensors, or strain gauges around the surface of housing that get squeezed by the contact between the robotic device 100 and the ferrous surface 170. Similarly, a rotation sensor, such as shaft encoder, may provide information about successful rotations to the robotic device 100 and a magnetic sensor, such as hall effect sensor, may be disposed on each coil/element of magnetic element to measure each magnetic field generated for confirmation.

In Block 1030, a magnetization protocol 930 is generated to be used to move the robotic device 100. As described in FIG. 9, the magnetization protocol 930 includes instructions to magnetize a sequence of the magnetic elements 410 over a period of time. The protocol be provided all at once to the wheel or there may be individual instructions cycled to the wheel one at the time. If the wheel does not have an internal processor, then all the magnetic elements may be controlled by the main robot's computer outside the wheel. In this case, the commands may be given one at a time. If there is a processor in the wheel, then the main computer gives the whole command sequence at once and the processor executes in the correct fashion and timing. Alternatively, a high level command can be provided to the wheel such as drive forward for 1 m at 0.5 m/s and the wheel will be configured for the right sequence and timing needed to achieve the high level command.

In Block 1040, the magnetization protocol is implemented by instructing at least one magnetic element out of the various magnetic elements 410 to magnetize. The at least one magnetic element is magnetized without magnetizing any other magnetic element out of the various magnetic elements 410. In this stage, the process to move the wheel includes a consideration for a speed and/or a weight of the wheel by timing the sequence of switching (e.g., magnetization and demagnetization as required by the magnetization protocol) may be faster to perform a faster rotational speed.

In Block 1050, the robotic device 100 is moved in the direction of movement at a speed determined based on the magnetization protocol 930.

Figure 11:
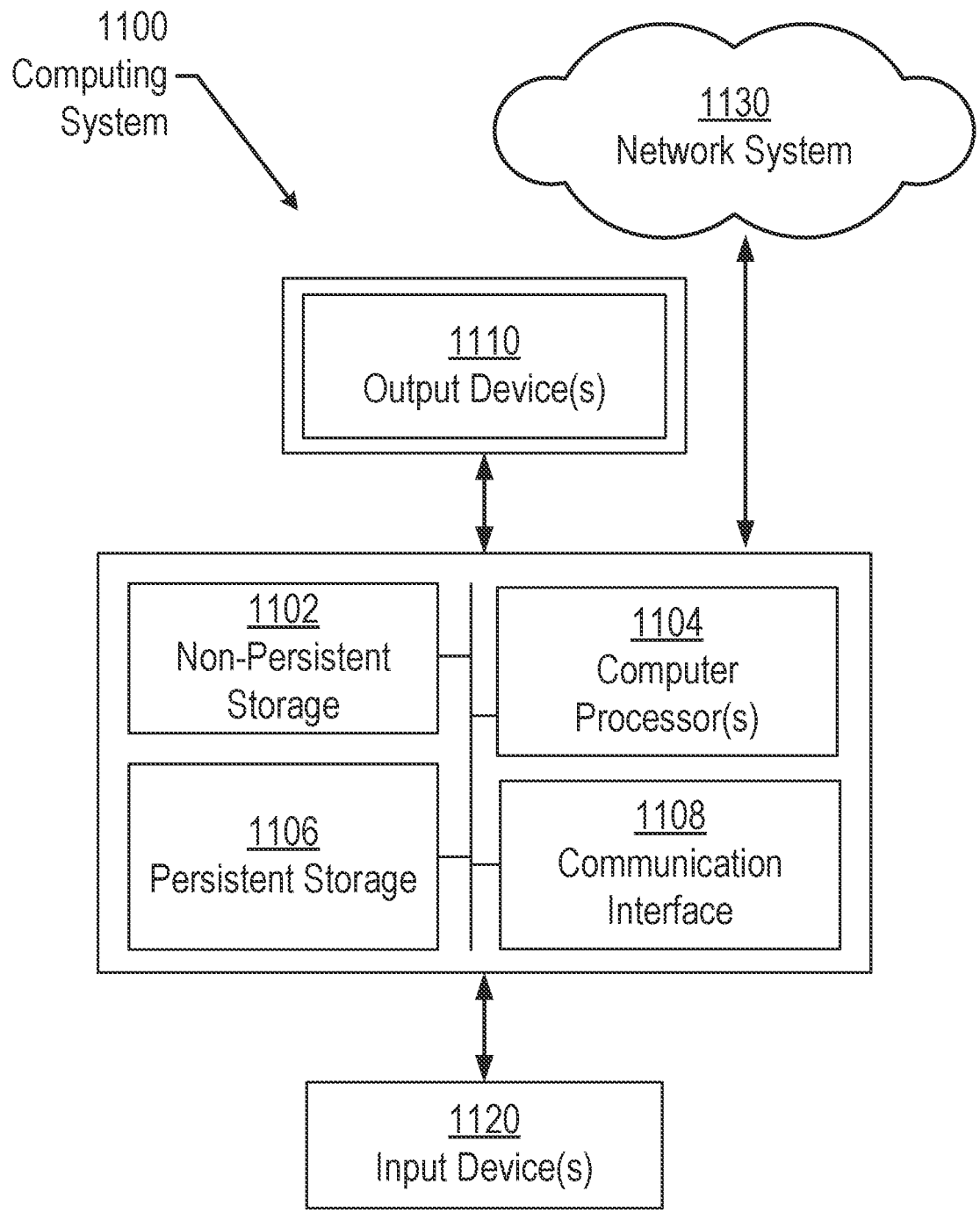
FIG. 11 shows a block diagram showing a computer system in accordance with one or more embodiments.

As shown in FIG. 11, the computing system 1100 may include one or more computer processor(s) 1104, non-persistent storage 1102 (e.g., random access memory (RAM), cache memory, or flash memory), one or more persistent storage 1106 (e.g., a hard disk), a communication interface 1108 (transmitters and/or receivers) and numerous other elements and functionalities. The computer processor(s) 1104 may be an integrated circuit for processing instructions. The computing system 1100 may also include one or more input device(s) 1120, such as a touchscreen, keyboard, mouse, microphone, touchpad, electronic pen, or any other type of input device. In some embodiments, the one or more input device(s) 1120 may be a surface panel connected to the control system 840 described in reference to FIG. 8. Further, the computing system 1100 may include one or more output device(s) 1110, such as a screen (e.g., a liquid crystal display (LCD), a plasma display, or touchscreen), a printer, external storage, or any other output device. One or more of the output device(s) may be the same or different from the input device(s). The computing system 1100 may be connected to a network system 1130 (e.g., a local area network (LAN), a wide area network (WAN) such as the Internet, mobile network, or any other type of network) via a network interface connection (not shown).

In one or more embodiments, for example, the input device 1120 may be coupled to a receiver and a transmitter used for exchanging communication with one or more peripherals connected to the network system 1130. The receiver may receive information relating to one or more resource rock samples. The transmitter may relay information received by the receiver to other elements in the computing system 1100. Further, the computer processor(s) 1104 may be configured for performing or aiding in implementing the processes described in reference to FIGS. 9 and/or 10.

Further, one or more elements of the computing system 1100 may be located at a remote location and be connected to the other elements over the network system 1130. The network system 1130 may be a cloud-based interface performing processing at a remote location from the well site and connected to the other elements over a network. In this case, the computing system 1100 may be connected through a remote connection established using a 5G connection, such as protocols established in Release 15 and subsequent releases of the 3GPP/New Radio (NR) standards.

The computing system in FIG. 11 may implement and/or be connected to a data repository. For example, one type of data repository is a database. A database is a collection of information configured for ease of data retrieval, modification, re-organization, and deletion. In some embodiments, the database includes published/measured data relating to the method, the assemblies, and the devices as described in reference to FIGS. 1-10.

While FIGS. 1-11 show various configurations of components, other configurations may be used without departing from the scope of the disclosure. For example, various components in FIG. 1-8 may be combined to create a single component. As another example, the functionality performed by a single component may be performed by two or more components.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A robotic device, the device comprising:
a housing comprising the shape of a wheel, the housing having a magnetically conductive outer surface and an inner chamber;
a plurality of magnetic elements disposed around the inner chamber of the housing, the plurality of magnetic elements being coupled to a first end of a power drive; and
a processor disposed in the inner chamber of the housing, the processor being coupled to a second end of a power drive,
wherein the processor uses the power drive to instruct at least one magnetic element out of the plurality of magnetic elements to magnetize,
wherein the at least one magnetic element is magnetized without magnetizing any other magnetic element out of the plurality of magnetic elements.

2. The device of claim 1, the device further comprising:
a transceiver that establishes a communication link with a control system; and
a localization system that transmits a location of the device to the control system.

3. The device of claim 1, the device further comprising:
a plurality of sensors that samples physical phenomena outside the housing and inside the internal chamber, the plurality of sensors comprising temperature sensors, pressure sensors, proximity sensors, stabilization sensors, electrical sensors, or photoelectric sensors.

4. The device of claim 1, the device further comprising:
a plurality of translation elements that allow the device to move in a direction of movement; and
a plurality of coordination elements coupled to the processor, the plurality of coordination elements being configured to control the plurality of translation elements to move in the direction of movement.

5. The device of claim 1, the device further comprising:
a power supply that energizes the power train, the power train being energized based on a magnetization protocol,
wherein the processor determines the magnetization protocol based on a number of magnetic elements in the internal chamber.

6. The device of claim 1,
wherein the housing comprises a shape of a sphere or a wheel, and
wherein each magnetic element out of the plurality of magnetic elements comprise a shape of a wedge.

7. The device of claim 6, the device further comprising:
a coupling point that connects the device to a chassis, the chassis comprising additional magnetic elements disposed in a semi-circle that matches half of the plurality of magnetic elements around the inner chamber.

8. The device of claim 6, the device further comprising:
a coupling point that connects the device to a chassis, the chassis comprising additional magnetic elements disposed in a quarter-circle that matches a quarter of the plurality of magnetic elements around the inner chamber.

9. The device of claim 1,
wherein the inner chamber comprises a plurality of magnetic elements, and
wherein the power drive extends across the plurality of magnetic elements.

10. The device of claim 9,
wherein the power drive is configured to magnetize or demagnetize each magnetic element out of the plurality of magnetic elements at any given time, and
wherein the processor implements a magnetization protocol that magnetizes or demagnetizes each magnetic element at a corresponding magnetization strength, each magnetization strength being determined based on a direction of movement.

11. A robotic assembly, the assembly comprising:
a robotic device, the robotic device comprising:
    a housing comprising the shape of a wheel, the housing having a magnetically conductive outer surface and an inner chamber,
    a plurality of magnetic elements disposed around the inner chamber of the housing, the plurality of magnetic elements being coupled to a first end of a power drive, and
    a processor disposed in the inner chamber of the housing, the processor being coupled to a second end of a power drive,
    wherein the processor uses the power drive to instruct at least one magnetic element out of the plurality of magnetic elements to magnetize, and
    wherein the at least one magnetic element is magnetized without magnetizing any other magnetic element out of the plurality of magnetic elements;
a chassis coupled to the robotic device, the chassis comprising additional magnetic elements disposed to match a portion of the plurality of magnetic elements around the inner chamber; and
a clamping element that connects the chassis to the robotic device.

12. The assembly of claim 11, the assembly further comprising:
a transceiver that establishes a communication link with a control system; and
a localization system that transmits a location of the device to the control system.

13. The assembly of claim 11, the assembly further comprising:
a plurality of sensors that samples physical phenomena outside the chassis, outside the housing, and inside the internal chamber, the plurality of sensors comprising temperature sensors, pressure sensors, proximity sensors, stabilization sensors, electrical sensors, or photoelectric sensors.

14. The assembly of claim 11, the assembly further comprising:
   a plurality of translation elements that allow the assembly to move in a direction of movement; and
   a plurality of coordination elements coupled to the processor, the plurality of coordination elements being configured to control the plurality of translation elements to move in the direction of movement.

15. The assembly of claim 11, the assembly further comprising:
   a power supply that energizes the power train, the power train being energized based on a magnetization protocol,
   wherein the processor determines the magnetization protocol based on a number of magnetic elements in the internal chamber.

16. The assembly of claim 11,
   wherein the inner chamber comprises a plurality of magnetic elements, and
   wherein the power drive extends across the plurality of magnetic elements.

17. The assembly of claim 16,
   wherein the power drive is configured to magnetize or demagnetize each magnetic element out of the plurality of magnetic elements at any given time, and
   wherein the processor implements a magnetization protocol that magnetizes or demagnetizes each magnetic element at a corresponding magnetization strength, each magnetization strength being determined based on a direction of movement.

18. A method for moving a robotic device, the method comprising:
   providing the robotic device, the device comprising:
      a housing comprising the shape of a wheel, the housing having a magnetically conductive outer surface and an inner chamber,
      a plurality of magnetic elements disposed around the inner chamber of the housing, the plurality of magnetic elements being coupled to a first end of a power drive,
      a plurality of sensors disposed in the robotic device, and
      a processor disposed in the inner chamber of the housing, the processor being coupled to a second end of a power drive;
   obtaining information relating to a direction of movement for the robotic device;
   evaluating magnetization information corresponding to the plurality of magnetic elements;
   generating, with the processor, a magnetization protocol to move the robotic device in the direction of movement, the magnetization protocol comprising instructions to magnetize a sequence of magnetic elements out of the plurality of magnetic elements over a period of time;
   implementing the magnetization protocol, with the processor, by using the power drive to instruct at least one magnetic element out of the plurality of magnetic elements to magnetize, the at least one magnetic element being magnetized without magnetizing any other magnetic element out of the plurality of magnetic elements;
   moving the robotic device in the direction of movement at a speed determined based on the magnetization protocol by rotating the housing about a lateral axis; and
   sampling a physical phenomena outside of the robotic device using at least one of the plurality of sensors.

19. The method of claim 18, the method further comprising:
   establishing a communication link with a control system; and
   transmitting a location of the device to the control system.

20. The method of claim 18, the method further comprising:
   sampling another physical phenomena inside the robotic device using at least one of the plurality of sensors,
   wherein the plurality of sensors comprises temperature sensors, pressure sensors, proximity sensors, stabilization sensors, electrical sensors, or photoelectric sensors.

* * * * *